US012422677B2

(12) United States Patent
Kress et al.

(10) Patent No.: US 12,422,677 B2
(45) Date of Patent: Sep. 23, 2025

(54) SLANTED SURFACE RELIEF GRATING REPLICATION BY OPTICAL PROXIMITY RECORDING

(71) Applicant: Microsoft Technology Licensing, LLC, Redmond, WA (US)

(72) Inventors: Bernard Charles Kress, Redwood City, CA (US); Ishan Chatterjee, Seattle, WA (US); Joel Steven Kollin, Seattle, WA (US); Maria Esther Pace, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 658 days.

(21) Appl. No.: 17/592,383

(22) Filed: Feb. 3, 2022

(65) Prior Publication Data
US 2023/0273432 A1   Aug. 31, 2023

(51) Int. Cl.
*G02B 5/18*   (2006.01)
*G02B 27/01*   (2006.01)

(52) U.S. Cl.
CPC ....... *G02B 27/0172* (2013.01); *G02B 5/1814* (2013.01); *G02B 5/1876* (2013.01); *G02B 27/0101* (2013.01); *G02B 2027/0178* (2013.01)

(58) Field of Classification Search
CPC ............. G02B 27/0172; G02B 5/1814; G02B 5/1876; G02B 27/0101; G02B 2027/0178; G02B 5/1857; G02B 27/0081
See application file for complete search history.

(56) References Cited

U.S. PATENT DOCUMENTS 11,209,656 B1 *  12/2021  Choi ................. G06F 3/016
2016/0231478 A1 *  8/2016  Kostamo ............ G02B 5/1819
(Continued)

FOREIGN PATENT DOCUMENTS

| JP | 2000330459 A | 11/2000 |
| WO | 2021242898 A1 | 12/2021 |
| WO | 2022015878 A1 | 1/2022 |

OTHER PUBLICATIONS

"International Search Report and Written Opinion Issued in PCT Application No. PCT/US22/050999", Mailed Date: Mar. 20, 2023, 13 Pages.

*Primary Examiner* — Bumsuk Won
*Assistant Examiner* — John Curtis Sipes
(74) *Attorney, Agent, or Firm* — Michael T. Abramson; Jordan IP Law, LLC

(57) ABSTRACT

Slanted surface relief gratings for use in an optical display system in an HMD device are replicated in a manufacturing process that utilizes non-contact optical proximity recording into a specialized photo-sensitive resin that is disposed over a waveguide substrate. The recording process comprises selective resin exposure to ultraviolet light through a mask to spatially record grating structures by interferential exposure and polymerization. Subsequent resin development evacuates unexposed resin down to the waveguide substrate to remove flat surfaces, referred to as a bias layer, that remain in the grating trenches after exposure. The resin development reduces Fresnel reflections that could otherwise be induced at the media interface between the bias layer and the waveguide substrate. Fresnel reflections may cause a loss of diffraction efficiency and thereby reduce the field of view that may be guided by the SRGs in the optical display system.

19 Claims, 16 Drawing Sheets

(56) References Cited

U.S. PATENT DOCUMENTS

| | | | |
|---|---|---|---|
| 2017/0131545 A1* | 5/2017 | Wall | G02B 27/4205 |
| 2017/0235219 A1* | 8/2017 | Kostamo | G02B 5/1857 |
| | | | 264/40.1 |
| 2017/0307886 A1 | 10/2017 | Stenberg et al. | |
| 2018/0172998 A1* | 6/2018 | Tekolste | G02B 6/0011 |
| 2018/0231702 A1* | 8/2018 | Lin | G02B 6/00 |
| 2019/0212588 A1* | 7/2019 | Waldern | B82Y 20/00 |
| 2019/0250563 A1* | 8/2019 | Tsen | G03H 1/2645 |
| 2020/0393736 A1* | 12/2020 | Hu | G02B 6/0011 |
| 2020/0409151 A1 | 12/2020 | Calafiore | |
| 2021/0026297 A1 | 1/2021 | Waldern et al. | |
| 2021/0063634 A1 | 3/2021 | Waldern et al. | |
| 2021/0149202 A1* | 5/2021 | Machida | G02B 27/0172 |
| 2022/0086419 A1* | 3/2022 | Qaderi | G03H 1/02 |
| 2023/0144296 A1* | 5/2023 | Tu | G02B 27/30 |
| | | | 359/641 |
| 2023/0417962 A1* | 12/2023 | Lee | G02B 27/4261 |
| 2024/0027670 A1* | 1/2024 | Waldern | G02B 27/4205 |

* cited by examiner

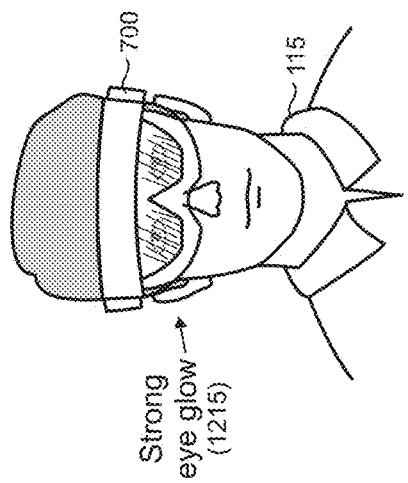
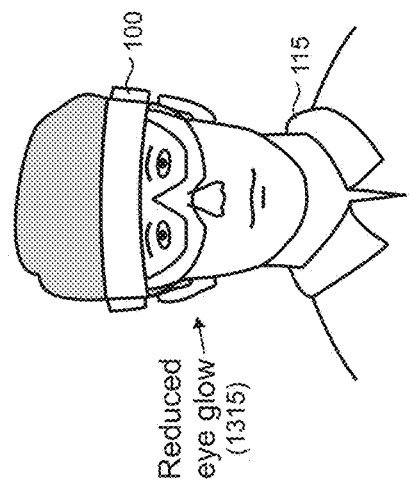
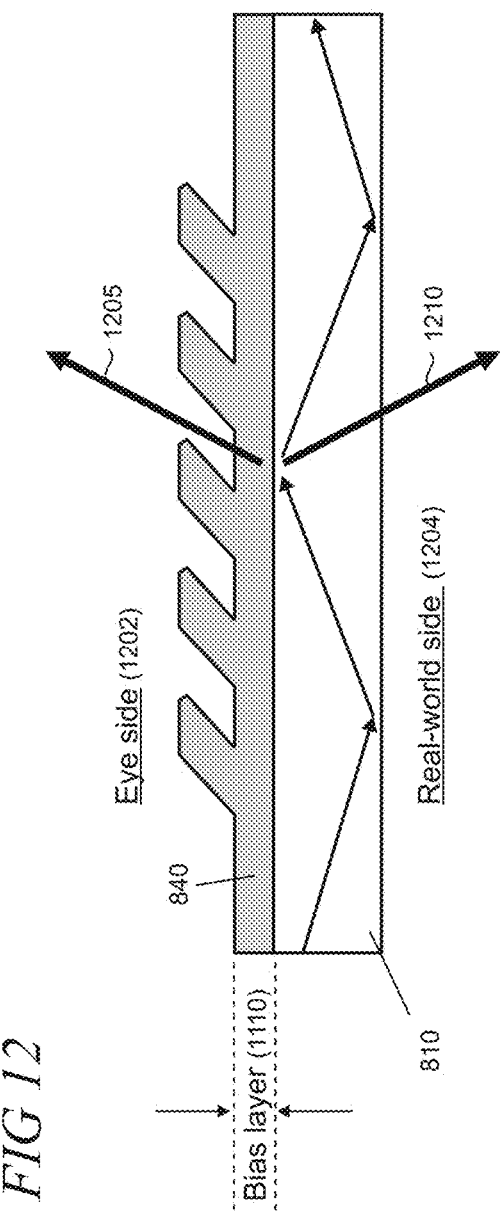
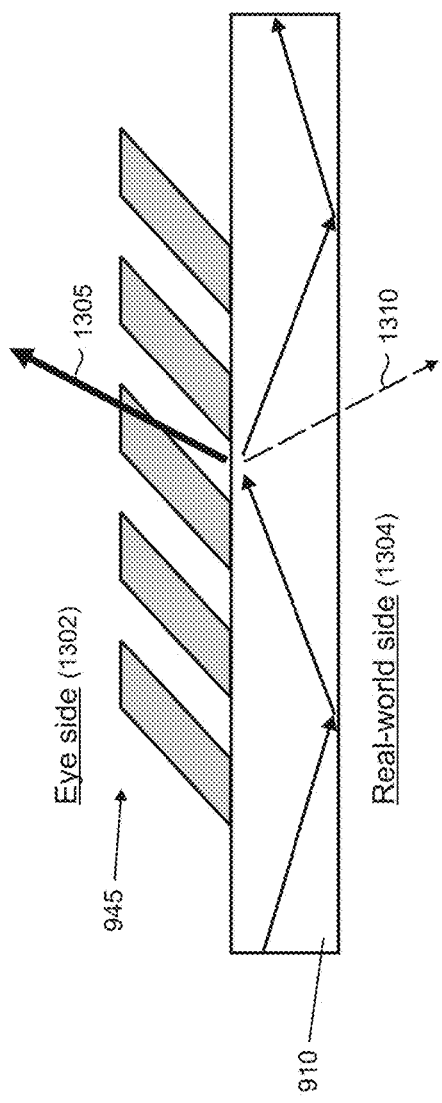
FIG 12
FIG 13

1900

SLANTED SURFACE RELIEF GRATING REPLICATION BY OPTICAL PROXIMITY RECORDING

BACKGROUND

Mixed-reality computing devices, such as head-mounted display (HMD) devices may be configured to display information to a user about virtual objects and/or real objects in a field of view (FOV). For example, an HMD device may be configured to display, using a see-through display system, virtual environments with real-world objects mixed in, or real-world environments with virtual objects mixed in. Diffractive optical elements (DOEs) can be utilized with waveguides in the display system to provide entrance pupil replication of virtual images from a display engine and guide the image light to the user's eyes over an enlarged eyebox. Such DOEs can be implemented as surface relief gratings (SRGs) in various blazed, slanted, binary, multilevel, and/or analog configurations in some applications.

SUMMARY

Slanted surface relief gratings (SRGs) for use in an optical display system in an HMD device are replicated in a manufacturing process that utilizes non-contact optical proximity recording into a specialized photo-sensitive resin that is disposed over a waveguide substrate. The recording process comprises selective resin exposure to ultraviolet (UV) light through a mask to spatially record grating structures by interferential exposure and polymerization. Subsequent resin development evacuates unexposed resin down to the waveguide substrate to remove flat surfaces, referred to as a bias layer, that remain in the grating trenches after exposure. The resin development reduces Fresnel reflections that could otherwise be induced at the media interface between the bias layer and the waveguide substrate. Fresnel reflections may cause a loss of diffraction efficiency and thereby reduce the FOV that may be guided by the SRGs in the optical display system.

As a non-contact process, the present optical proximity recording enables a thicker resin layer to be processed relative to that used in conventional mechanical stamping processes such as nanoimprint lithography (NIL). Therefore, slanted SRGs replicated using optical proximity recording may include grating features having increased aspect ratio (height/width) compared to conventional SRGs that are typically limited by the depth of the stamp structures. The increased grating feature height allows for use of resin materials that have a lower refractive index compared to conventional NIL-produced SRGs, which provides increased grating efficiency and lowers secondary effects (e.g., scattering, diffusion, blue and/or green light absorption) that may result from the high index resin nanofillers that are typically utilized.

The lower refractive index and increased height of grating features produced by optical proximity recording further provides the replicated SRGs with stronger Bragg selectivity. Behavior of the present SRGs can thereby approach that of volume holographic gratings in reducing parasitic diffraction away from the HMD device user towards the surrounding environment. In conventional SRGs, such field extraction in the wrong direction can be strong, causing a phenomenon known as "eye glow" which can reduce social comfort by obscuring the user's eyes in some applications or undesirably increase HMD device observability in other applications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIG. 12 shows an illustrative conventional diffraction grating having low Bragg selectivity such that diffraction occurs on both the eye side and real-world side of a waveguide to thereby cause strong eye glow;

FIG. 13 shows an illustrative diffraction grating produced using the present slanted surface relief grating replication by optical proximity recording process that has stronger Bragg selectivity to thereby reduce eye glow;

Like reference numerals indicate like elements in the drawings. Elements are not drawn to scale unless otherwise indicated.

DETAILED DESCRIPTION

Figure 1:
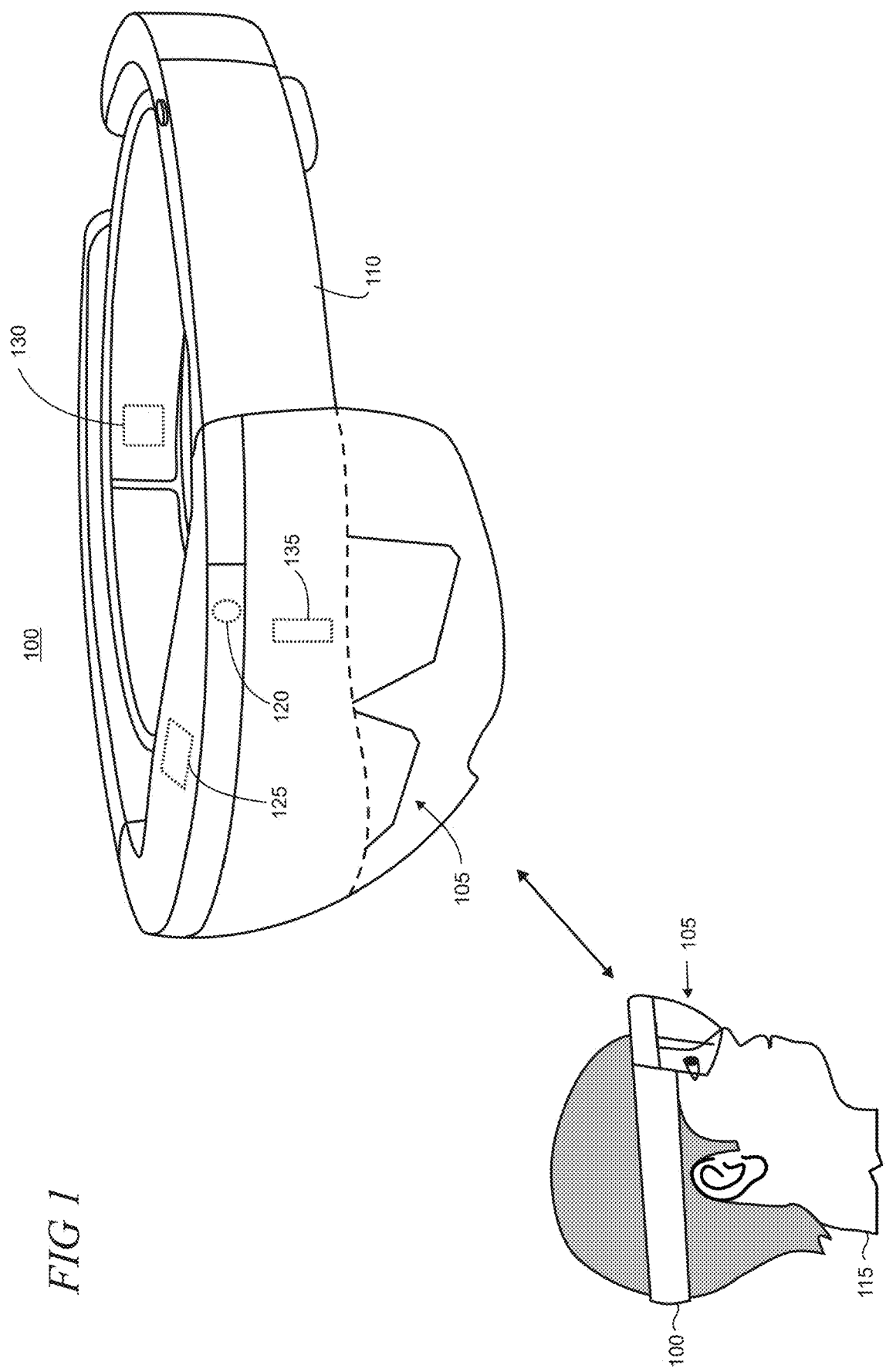
FIG. 1 shows a pictorial partially cutaway view of an illustrative mixed-reality HMD device.

FIG. 1 shows a pictorial partially cutaway view of an illustrative mixed-reality HMD device 100. In this example, the HMD device includes a display system 105 and a frame 110 that wraps around the head of a user 115 to position the display system near the user's eyes to provide a virtual-reality or mixed-reality experience to the user.

Any suitable technology and configuration may be used to display images using the display system. For example, for a virtual-reality experience, the display system may be an opaque light-emitting diode (LED) display, a liquid crystal display (LCD), a micro-electromechanical system (MEMS) scanner display system, or any other suitable type of opaque display device. In some implementations, outward facing cameras 120 may be provided that capture images of the surrounding physical environment, and these captured images may be rendered on the display system 105 along with computer-generated virtual images that augment the captured images of the physical environment.

For a mixed-reality experience, the display system 105 may be see-through so that the user of the HMD device 100 can view physical, real-world objects in the physical environment over which pixels for virtual objects are overlayed. For example, the display system may include one or more partially transparent waveguides used in conjunction with a virtual image-producing imager or display engine.

The frame 110 may further support additional components of the HMD device 100, including a processor 125, an inertial measurement unit (IMU) 130, and an eye tracker 135. The processor may include logic and associated computer memory configured to receive sensory signals from the IMU and other sensors, to provide display signals to the display system 105, to derive information from collected data, and to enact various control processes described herein.

The display system 105 may be arranged in some implementations as a near-eye display. Near-eye display systems are often used, for example, in head-mounted display (HMD) devices in industrial, commercial, and consumer applications. Other devices and systems may also use near-eye display systems, as described below. The near-eye display system is an example that is used to provide context and illustrate various features and aspects of the present slanted SRG replication by optical proximity recording and is not intended to be limiting.

In a near-eye display the imager does not actually shine the images on a surface such as a glass lens to create the display for the user. This is not feasible because the human eye cannot focus on something that is that close. Rather than create a visible image on a surface, the near-eye display uses an optical system to form a pupil and the user's eye acts as the last element in the optical chain and converts the light from the pupil into an image on the eye's retina as a virtual display. It may be appreciated that the exit pupil is a virtual aperture in an optical system. Only rays which pass through this virtual aperture can exit the system. Thus, the exit pupil describes a minimum diameter of the virtual image light after leaving the display system. The exit pupil defines the eyebox which comprises a spatial range of eye positions of the user in which the virtual images projected by the display system are visible.

Figure 2:
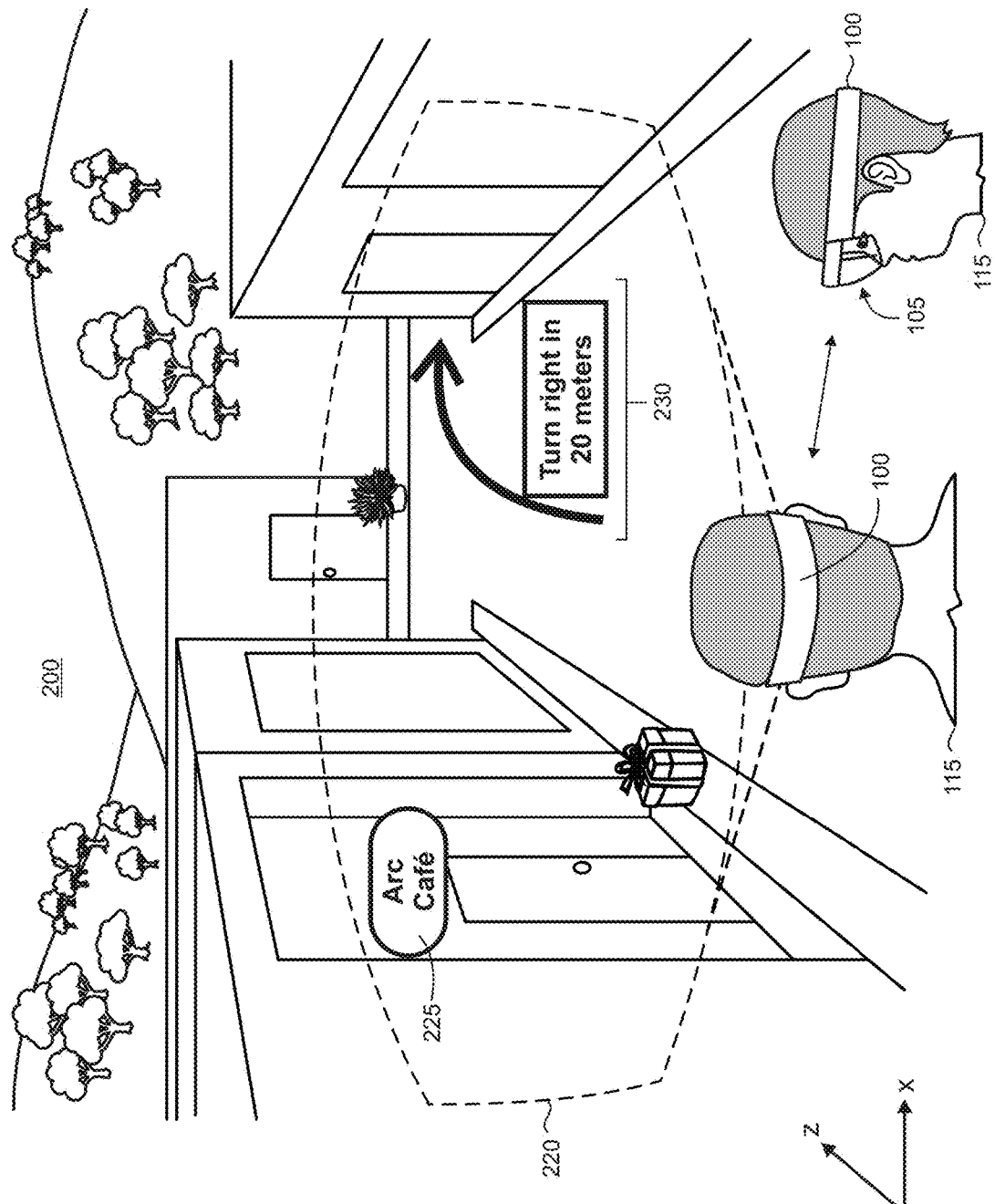
FIG. 2 illustratively shows virtual images that are overlayed onto real-world images within a field of view (FOV) of a mixed-reality head-mounted display (HMD) device.

FIG. 2 shows the HMD device 100 worn by a user 115 as configured for mixed-reality experiences in which the display system 105 is configured as a near-eye display system having at least a partially transparent, see-through waveguide, among various other components. As noted above, a suitable display engine (not shown) generates virtual images that are guided by the waveguide in the display system to the user. Being see-through, the waveguide in the display system enables the user to perceive light from the real world.

The see-through waveguide-based display system 105 can render images of various virtual objects that are superimposed over the real-world images that are collectively viewed using the see-through waveguide display to thereby create a mixed-reality environment 200 within the HMD device's FOV (field of view) 220. It is noted that the FOV of the real world and the FOV of the virtual world are not necessarily identical, as the virtual FOV provided by the display system is typically a subset of the real FOV. FOV is typically described as an angular parameter in horizontal, vertical, or diagonal dimensions.

It is noted that FOV is just one of many parameters that are typically considered and balanced by HMD device designers to meet the requirements of a particular implementation. For example, such parameters may include eyebox size, brightness, transparency and duty time, contrast, resolution, color fidelity, depth perception, size, weight, form-factor, and user comfort (i.e., wearable, visual, and social), among others.

Figure 3:
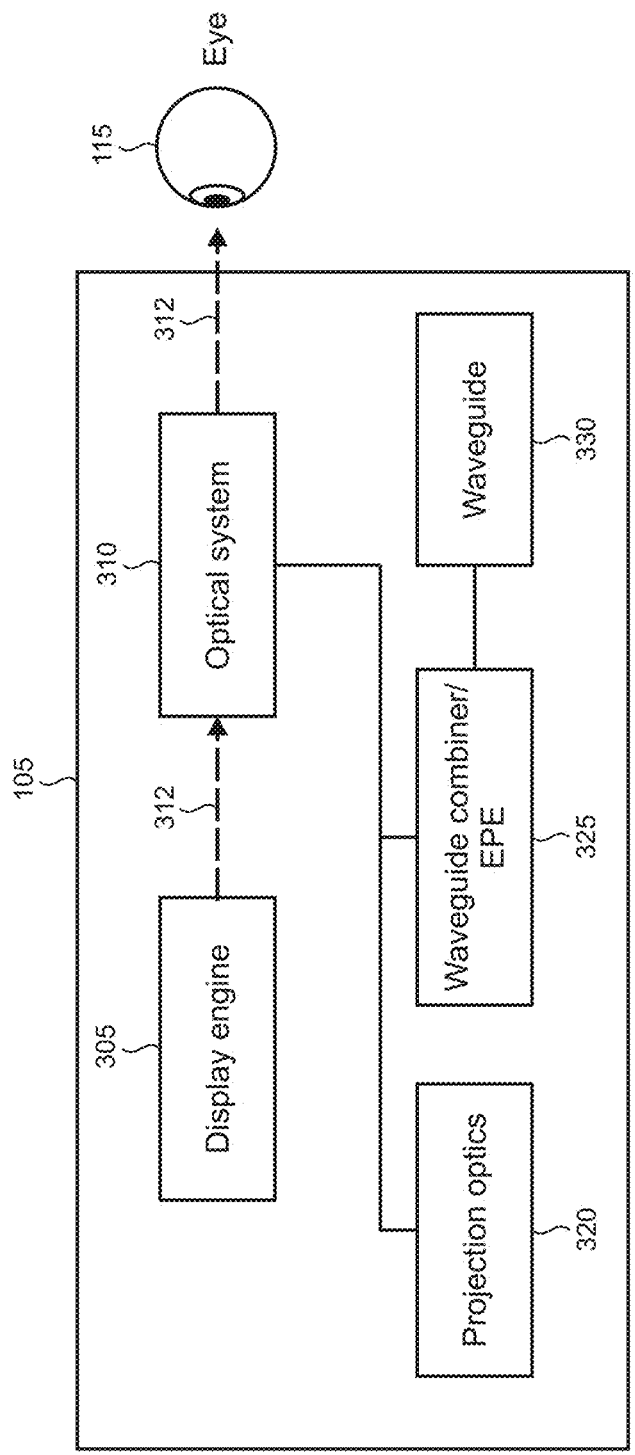
FIG. 3 shows illustrative components of a display system that may be utilized in a mixed-reality HMD device.

FIG. 3 shows illustrative components of the display system 105 that may be utilized in the HMD device in an illustrative mixed-reality embodiment. The display system includes a display engine 305 and an optical system 310 to provide virtual and real images to the user 115 over a light path 312. The optical system may include projection optics 320 (e.g., magnifying and/or collimating lenses, MEMS (micro-electro mechanical system) devices, or the like), and a waveguide combiner 325 that provides exit pupil expander (EPE) functionality that may be implemented using at least one waveguide 330.

Multiple diffractive optical elements (DOEs, also synonymously referred to as diffraction gratings) are disposed on the waveguide 330 and configured to provide in-coupling of incident light into the waveguide, exit pupil expansion in two directions, and out-coupling of light out of the waveguide to an eye 115 of a system user. In an illustrative embodiment, one or more of the DOEs may be implemented as SRGs.

The display engine 305 in the display system 105 may include one or more sources of virtual images (e.g., images representing objects from a virtual world that are not necessarily stereo images) that interoperate with the display system to deliver virtual images as a virtual display to a user's eye 115. The display engine may include, for example, RGB (red, green, blue) light emitting diodes (LEDs), LCOS (liquid crystal on silicon) devices, OLED (organic light emitting diode) arrays, MEMS devices, or any other suitable displays or micro-displays operating in transmission, reflection, or emission. The display engine may also include electronics such as processors, optical components such as mirrors and/or lenses, and/or mechanical and other components that enable a virtual display to be composed and provide one or more input optical beams to the optical system.

In a near-eye display system the imager does not actually shine the images on a surface such as a glass lens to create the visual display for the user. This is not feasible because the human eye cannot focus on something that is that close. Rather than create a visible image on a surface, the near-eye display system 100 uses the optical system to form a pupil and the eye 115 acts as the last element in the optical chain and converts the light from the pupil into an image on the eye's retina as a virtual display. It may be appreciated that the exit pupil is a virtual aperture in an optical system. Only rays which pass through this virtual aperture can exit the system. Thus, the exit pupil describes a minimum diameter of the virtual image light after leaving the display system. The exit pupil defines the eyebox which comprises a spatial range of eye positions of the user in which the virtual images projected by the display system are visible.

The waveguide 330 facilitates light transmission between the imager and the eye. One or more waveguides can be utilized in the near-eye display system because they are transparent and because they are generally small and lightweight (which is desirable in applications such as HMD devices where size and weight are generally sought to be minimized for reasons of performance and user comfort). For example, the waveguide 330 can enable the display engine 305 to be located out of the way, for example, on the side of the user's head or near the forehead, leaving only a relatively small, light, and transparent waveguide optical element in front of the eyes.

Figure 4:
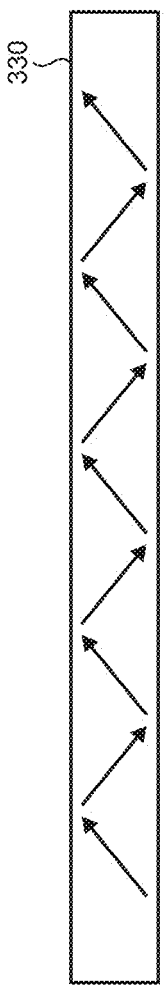
FIG. 4 shows propagation of light in a waveguide by total internal reflection (TIR)

In an illustrative implementation, the waveguide 330 operates using a principle of total internal reflection (TIR), as shown in FIG. 4, so that light can be coupled among the various optical elements in the display system. TIR is a phenomenon which occurs when a propagating light wave strikes a medium boundary (e.g., as provided by the optical substrate of a waveguide) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta c$ is the critical angle for two optical mediums (e.g., the waveguide substrate and air or some other medium that is adjacent to the substrate) that meet at a medium boundary, n1 is the index of refraction of the optical medium in which light is traveling towards the medium boundary (e.g., the waveguide substrate, once the light is coupled therein), and n2 is the index of refraction of the optical medium beyond the medium boundary (e.g., air or some other medium adjacent to the waveguide substrate).

Figure 5:
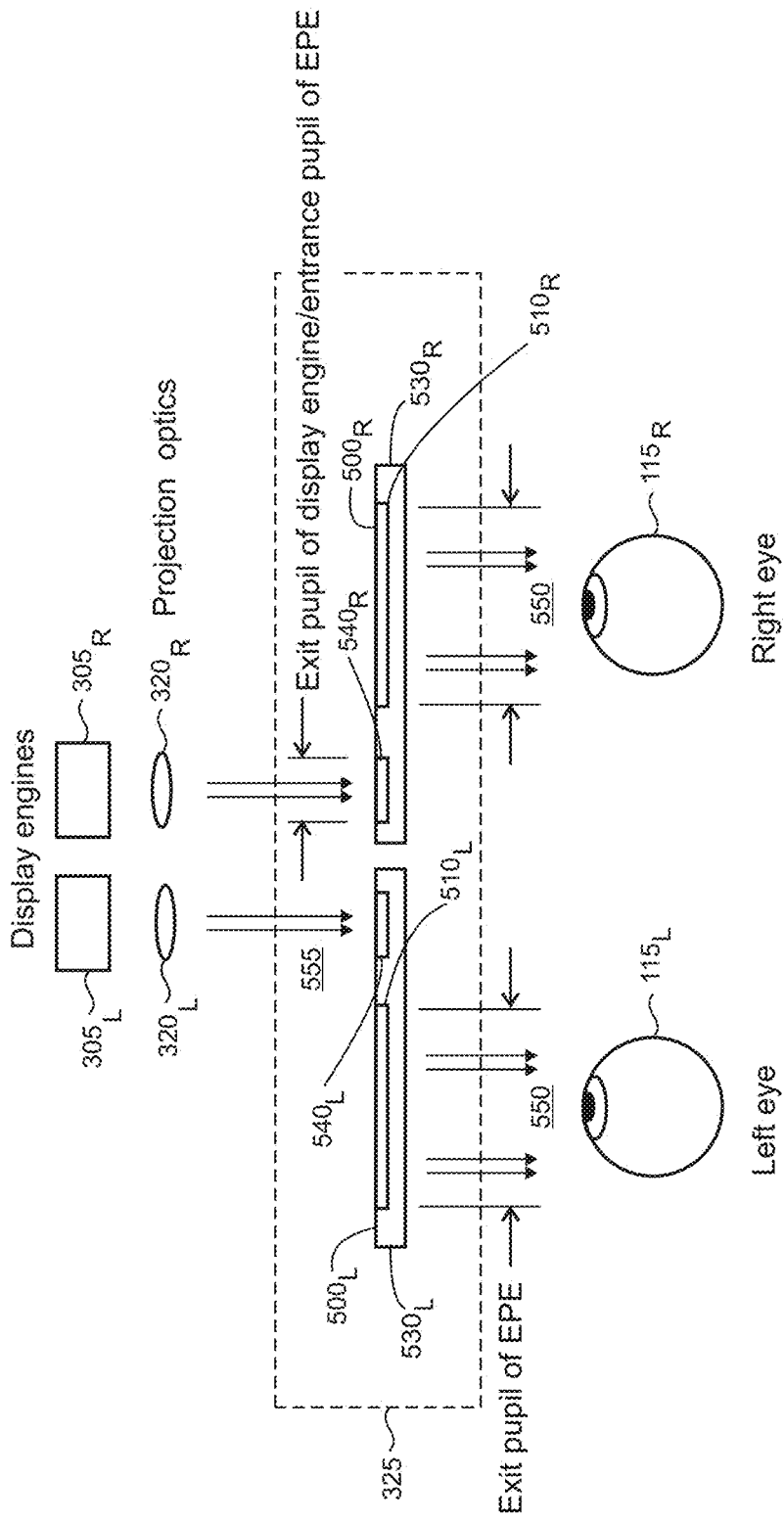
FIG. 5 shows a top view of an illustrative waveguide combiner with an exit pupil expander in which the exit pupil is expanded along two directions of a field of view (FOV)

FIG. 5 shows a top view of an illustrative waveguide combiner 325 having an exit pupil expander in which the exit pupil is expanded along two directions of an FOV. The waveguide combiner comprises individual left and right displays ($500_L$ and $500_R$) that interface with respective display engines ($305_L$ and $305_R$) and projection optics ($320_L$ and $320_R$). Each display in the waveguide combiner receives one or more input optical beams 555 from a respective display engine as an entrance pupil for virtual image light to produce one or more output optical beams 550 with expanded exit pupil in one or two directions relative to the input. The expanded exit pupil typically facilitates a virtual display to be sufficiently sized to meet the various design requirements, such as eyebox size, image resolution, FOV, and the like, of a given optical system while enabling the display engine and associated components to be relatively light and compact.

The display system is configured, in this illustrative example, to provide binocular operation for both the left and right eyes which may support binocular or stereoscopic viewing. Some components that may be utilized for binocular or stereoscopic operation such as scanning mirrors, lenses, filters, beam splitters, MEMS devices, or the like are not shown in FIG. 5 for sake of clarity in exposition. The waveguide combiner 325 utilizes two out-coupling DOEs, $510_L$ and $510_R$ that are supported on the waveguides $530_L$ and $530_R$ and two in-coupling DOEs $540_L$ and $540_R$.

The in-coupling and out-coupling DOEs may be configured using multiple DOEs and may further include one or more intermediate DOEs (not shown) as described below. The DOEs may be arranged in various configurations on the waveguide 330, for example, on the same side or different sides and may further be single- or double-sided. While the waveguide combiner 325 is depicted as having a planar configuration, other shapes may also be utilized including, for example, curved or partially spherical shapes, in which case gratings in the DOEs disposed thereon may be non-co-planar.

In typical implementations, the input beams are collimated such that the output beams are also collimated, as indicated by the parallel lines in FIG. 5. Typically, in waveguide combiners, the input pupil needs to be formed over a collimated field, otherwise each waveguide exit pupil will produce an image at a slightly different distance. This results in a mixed visual experience in which images are overlapping with different focal depths in an optical phenomenon known as focus spread. As discussed below in the text accompanying FIG. 19, lenses or other suitable devices may be utilized to for divergent output rays to implement virtual image focus at some non-infinite distance from the user.

Figure 6:
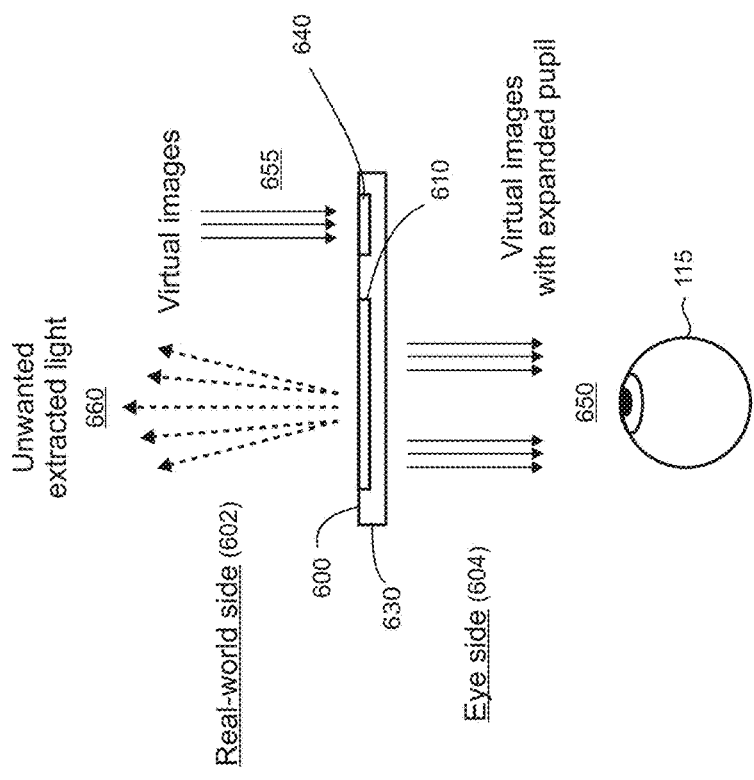
FIG. 6 illustratively shows a field propagating in a waveguide combiner being extracted on the real-world side of the combiner that produces a phenomenon referred to as "eye glow"

While conventional SRGs can provide satisfactory performance in many applications, they are prone to a phenomenon referred to here as "eye glow." As shown in FIG. 6, virtual images 655 in-coupled from a display engine (not shown) at an in-coupling DOE 640 are out-coupled as beams 650 to the user 115 via a conventionally-configured out-coupling DOE 610 (e.g., fabricated using NIL) towards the eye side 604 of the display system 600. Simultaneously, some virtual image fields 660 are extracted from the waveguide 630 randomly towards the real-world side 602 of a display system. In typical multicolor HMD device configurations using conventional SRGs, the eye glow can be especially strong in a rainbow of colors. While the extracted field is undesired because it lowers the efficiency of the display system and wastes light, it can also present some issues during HMD device use, as discussed below.

Figure 7:
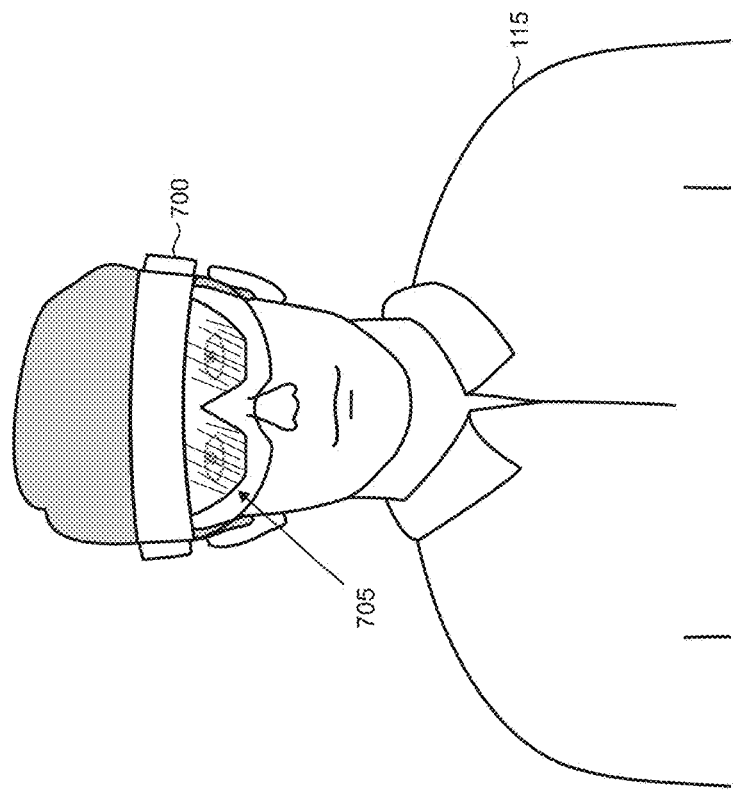
FIG. 7 shows a front view of a user with an HMD device in which eye glow causes partial occlusion of the user's eyes, among other issues.

FIG. 7 shows a user 115 wearing an HMD device 700 that uses conventional SRGs in its display system. As indicated by reference numeral 705, eye glow directed towards the real-world side of the device manifested by the unwanted extracted field can partially or completely obscure the eyes of the user. In some mixed-reality environments, for example, a "hybrid presence" is experienced in which the user has a sense of presence of both virtual and real human beings. If eyes are replaced by eye glow, then eye contact among device users can be difficult to maintain. This can diminish the experience of a real presence and thereby reduce social comfort of the HMD device.

In other HMD device use scenarios, the visibility of the forward projecting eye glow to others can negatively impact a user's experience, for example, at nighttime or in dark environments. Readily perceived eye glow may represent a security risk when an HMD device user's location should not be revealed, for example in security/police/military settings.

As discussed below in the text accompanying FIGS. 12 and 13, the present optical proximity recording process can produce SRGs with stronger Bragg selectivity to reduce unwanted field extraction to the real-world side of the display system.

Figure 8A:
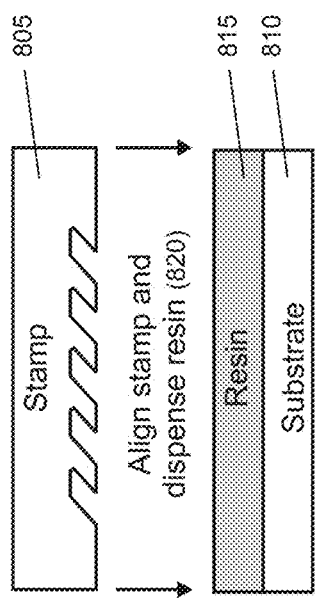
FIGS. 8A, 8B, and 8C show an illustrative process for manufacturing surface relief gratings using a conventional nanoimprint lithography (NIL) technique.
Figure 8B:
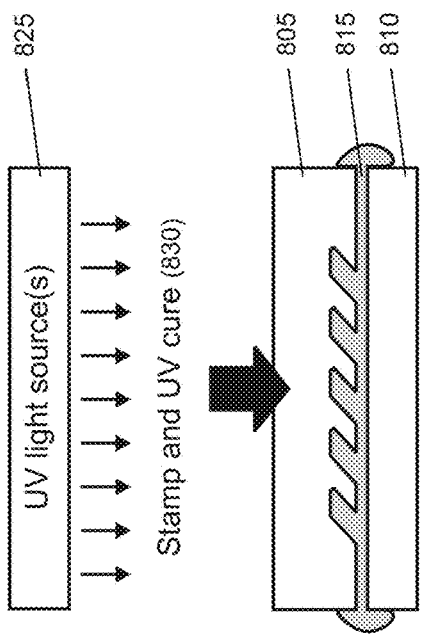
Figure 8C:
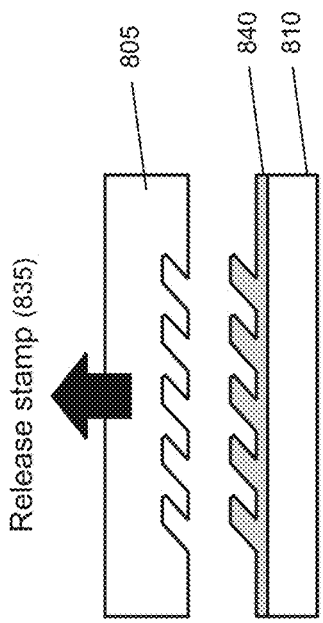

FIGS. 8A, 8B, and 8C show an illustrative process for manufacturing surface relief gratings using a conventional nanoimprint lithography (NIL) technique. In FIG. 8A, an elastomer (i.e., "soft") stamp 805 is produced from a hard master. The stamp is aligned with an optical substrate 810 configured as a waveguide on which a deformably-viscous photo-sensitive resin layer 815 is dispensed, as indicated by reference numeral 820.

In FIG. 8B, the stamp 805 is pressed against the resin layer 815 using mechanical force to imprint micro-/nano-structures (collectively referred to as nanostructures) in the resin which are then cured using light from one or more UV light sources 825, as indicated by reference numeral 830, via cross-linking in the resin. In typical implementations, the mechanical force is relatively low compared to conventional thermal NIL processing and the imprinting can be carried out at room temperature.

In FIG. 8C, the stamp 805 is released from the cured resin, as indicated by reference numeral 835. After the stamp is detached, a negative pattern of the stamp is imprinted on the cured resin layer to produce an NIL-imprinted SRG 840. Some additional curing or other post-processing may be utilized (not shown) in some cases to further develop SRG features or provide additional shaping or treatment. For example, the SRG may be apodized using ashing in a plasma, or atomic layer deposition (ALD) may be utilized to increase resistance of the SRG to variations in environmental factors such as temperature, pressure, humidity, etc.

FIGS. 9A, 9B, 9C, and 9D show an illustrative process for the present slanted surface relief grating replication by optical proximity recording. The recording process includes resin exposure to define a spatial resolution for SRG nanostructures using photolithography and resin development to remove excess resin down to the substrate to thereby eliminate a bias layer that exists with conventional NIL to reduce Fresnel reflections.

Figure 9A:
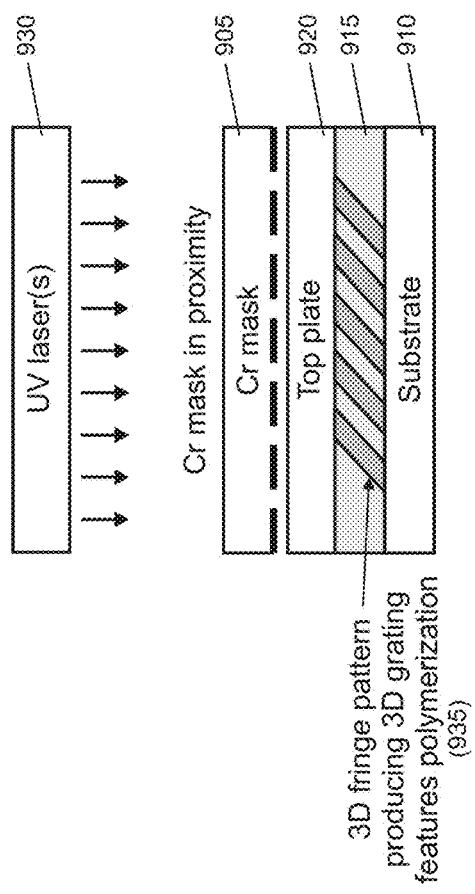
FIGS. 9A, 9B, 9C, and 9D show an illustrative process for the present slanted surface relief grating replication by optical proximity recording.

In FIG. 9A, a mask 905 is provided using, for example, a binary chromium (Cr) layer on a glass mask. The mask is aligned with an optical substrate 910 configured as a waveguide on which a specialized deformably-viscous photo-sensitive resin layer 915 is dispensed between in an enclosed volume between the waveguide substrate and a removable top plate 920, as indicated by reference numeral 925. The top plate may be configured to be optically transparent to the particular wavelengths that are utilized for exposure.

Figure 9B:
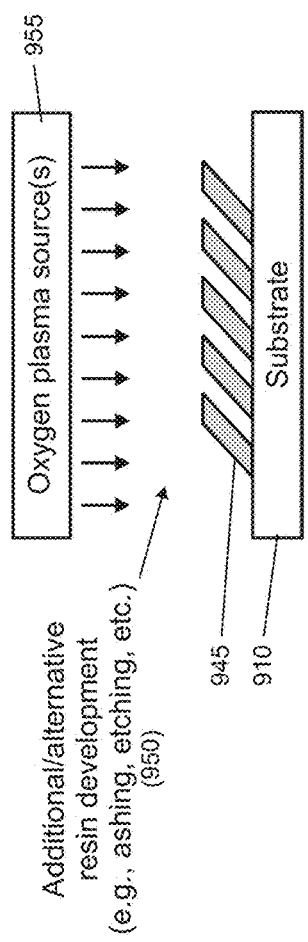

The resin layer may comprise a photopolymerizable monomer, photoinitiator dyes, coinitiators, and a liquid crystal (LC) mixture (e.g., a holographic polymer dispersed liquid crystal (HPDLC) mixture) that undergoes photopolymerization-induced phase separation creating regions populated by liquid crystal micro-droplets, interspersed with regions of clear polymer during the exposure process shown in FIG. 9B. Here, the Cr mask is placed in proximity to the resin layer and one or more UV lasers 930 or other suitable sources are operated to diffract at least one recording light beam through the mask using interferential exposure to produce phase separation and polymerization reaction in the mixture. Typically, the principle of interferometry involves propagating coherent electromagnetic waves of the same frequency to interfere with each other and the resulting pattern is determined by the phase relations between them. It may be appreciated that suitable single beam and/or multi-beam photolithographic techniques may be utilized to create a suitable interference pattern depending on the needs of a particular implementation of the present slanted surface relief grating replication.

The interference pattern produced for a given implementation of optical proximity recording may be sensitive to optical proximity spacing between the Cr mask 905 and the resin layer 915, mask characteristics (e.g., aperture size, shape, spacing, or pattern, etc.), and recording light beam characteristics, among other factors. The interferential exposure process records alternating liquid crystal-rich and liquid crystal-depleted regions that form the fringe planes of the grating nanostructures, as indicated by reference numeral 935. The grating structures can be formed with slanted or non-slanted fringes depending on how the recording beams are configured.

In an illustrative embodiment, the HPDLC mixture may comprise a reactive monomer liquid crystal mixture (RMLCM). An RMLCM can include monomer acrylates, multi-functional acrylates, a cross-linking agent, a photoinitiator, and LC. The mixture may also include a surfactant.

RMLCMs can be formulated with varying compositions of different components. In many embodiments, the RMLCM mixture includes a liquid crystal mixture, a complex mixture of acrylates and acrylate esters, 3-methacryloxypropyltrimethoxysilane (e.g., Dynasylan® MEMO), and photo-initiators. In further embodiments, the RMLCM includes 2-ethylhexylacrylate (EHA) and 2,2,3,3,4,4,5,5,6,6,7,7-Dodecafluoroheptyl acrylate (DFHA). In a number of embodiments, low functionality monomers are included in the RMLLCM. Such RMLCM mixtures can achieve nearly complete phase separation of the LC material from the polymer.

Figure 9C:
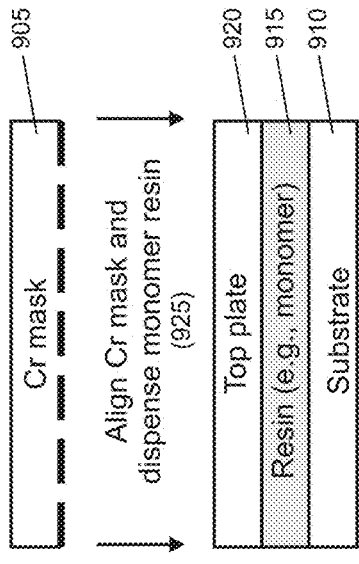
Figure 9D:
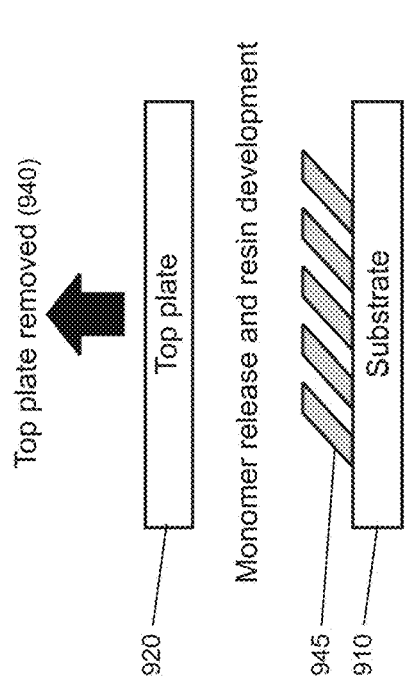

In FIG. 9C, the top plate is removed, as indicated by reference numeral 940, and subsequent resin development realizes the replicated SRG 945. The resin development can comprise any suitable method for evacuating and/or stripping away the residual HPDLC/RMLCM mixture, for example, mechanical and/or chemical stripping that can minimize any residual resin mixture that remains between the grating features of the SRG. In an illustrative embodiment, as shown in FIG. 9D and indicated by reference numeral 950, subsequent resin development may include ashing the SRG in an oxygen plasma supplied from one or more sources 955. Plasma ashing, reactive ion beam etching (RIBE), and/or other suitable processes, may aid in removing any residual resin and/or bias layer produced by the optical proximity recording down to the substrate in some cases. For example, some of the residual mixture may experience some degree of cross-linking during the resin exposure which may not be amenable to removal through other stripping processes. Accordingly, ashing may be used in addition to, or as an alternative to other stripping processes, depending on the needs of a particular implementation.

The optical proximity recording process described above provides numerous advantages and solves many of the limitations of conventional NIL. The Cr mask using simple two-dimensional amplitude structures is less complicated to fabricate compared to the NIL hard master which has nanometer-scale structures. The Cr mask has significantly longer lifespan compared to the NIL soft stamps because there is no physical contact between the mask and resin during SRG replication. Such lack of contact also ensures highly consistent replication from part to part because stamp wear is not a factor. In addition, a thicker resin layer may be manipulated, as discussed above, because restrictions in filling deep stamp passages with resin during imprinting are eliminated. Volume production is also streamlined as optical proximity recording may be used to directly produce SRGs as a plate process rather than a wafer scale process with wafer handling as with NIL which requires relatively large dies to produce SRGs for HMD devices.

Figure 10:
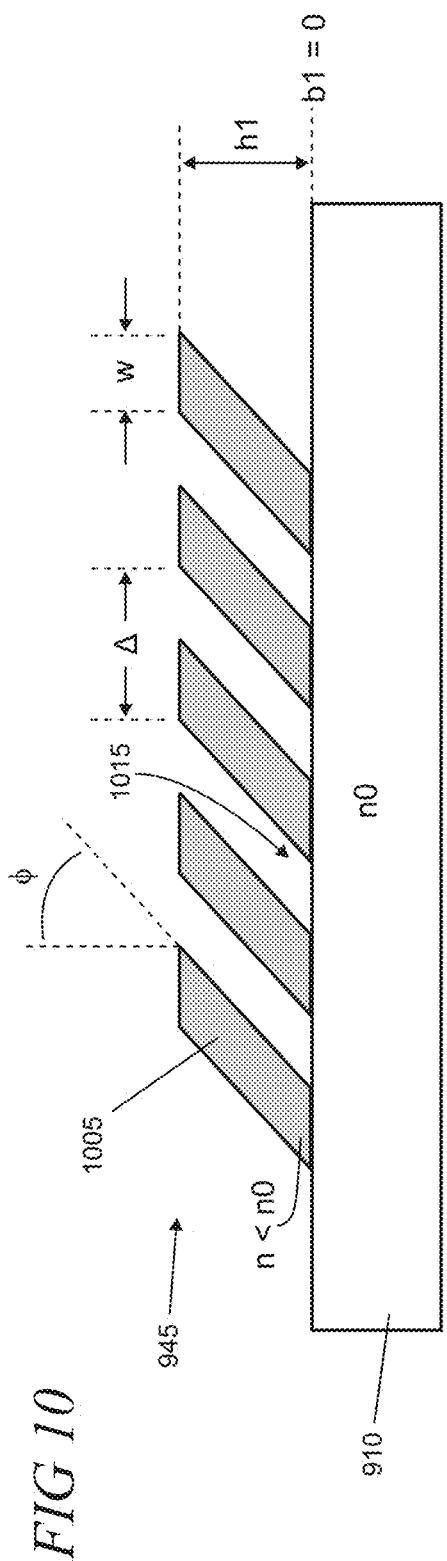
FIG. 10 shows a profile of a portion of an illustrative diffraction grating that has slanted gratings replicated using the present optical proximity recording process.

FIG. 10 shows a profile of a portion of SRG 945 replicated using the present optical proximity recording process. As shown, the grating features (representatively indicated by reference numeral 1005) are slanted at some predetermined angle with a groove period of A. Slanted gratings can be very versatile elements and generally provide SRG design flexibility because their spectral and angular bandwidths can be tuned by the slant angles. Front and back slant angles in a same period (or from period to period) can be carefully tuned to achieve the desired angular and spectral operation. The width of the gratings is w and height of the gratings 1005 is h1. As shown, the bias layer height is b1=0 because, as discussed above, the resin development step in the optical proximity recording process removes any bias layer in the trenches 1015 that remains after exposure.

Figure 11:
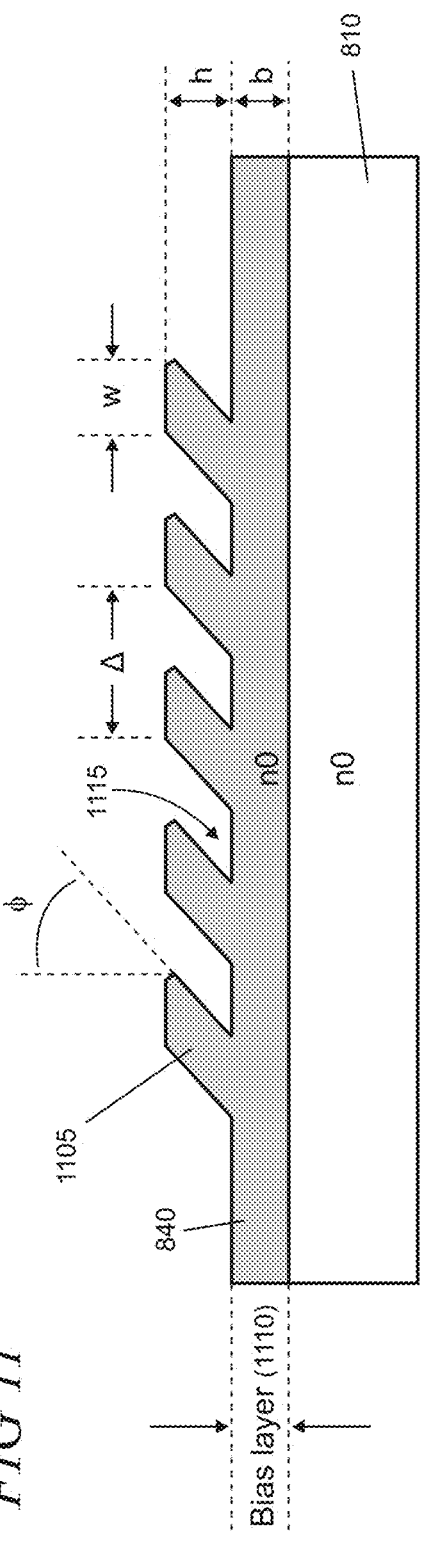
FIG. 11 shows a profile of a portion of an illustrative diffraction grating that has slanted gratings produced using a conventional NIL process.

FIG. 11 shows a profile of a portion of the SRG 840 produced using a conventional NIL process. As shown, the grating features (representatively indicated by reference numeral 1105) are slanted at some predetermined angle φ with a groove spacing of Δ. The gratings have a width w and a height h that is lower than that shown in FIG. 10 (i.e., h<h1). The SRG includes a bias layer 1110 with height b that results from the imprinting process's inability to completely evacuate the resin from the trenches 1115 between the grating features. The bias layer operates as a flat interface which may act as a Fresnel reflection surface that can limit the FOV of the fields that propagate from the waveguide substrate to the gratings.

As the SRG 840 has relatively short grating features 1105, to maintain acceptable grating efficiency and avoid undesirable Fresnel reflections, the refractive index of the SRG needs to be at least as high as that of the waveguide substrate 810. Thus, as shown, a refractive index of n0 is applicable to both the SRG and substrate. High index resins may have their own limitations, such as diffusion and scatter, due to $TiO_2$ or $ZnO_2$ nanofillers, and absorption of blue and/or green colors.

FIG. 12 shows the conventional SRG 840 having low Bragg selectivity due to the presence of the bias layer 1110. As shown, this characteristic results in diffraction occurring on both the eye side 1202 and real-world side 1204 of the waveguide 810, as indicated by arrows 1205 and 1210. The diffraction to the real-world side causes strong eye glow 1215 as shown in the illustrative HMD device 700 on the right-hand side of the drawing.

By comparison, FIG. 13 shows the SRG 945 produced using the present optical proximity recording that has stronger Bragg selectivity resulting from a higher aspect ratio and lower refractive index to thereby reduce eye glow 1315 in the HMD device 100. As shown, the eye side is indicated by reference numeral 1302 and the real-world side by reference numeral 1304. While relatively strong diffraction occurs to the eye side of the waveguide, indicated by arrow 1305, the parasitic loss of light due to real-world side diffraction 1310 is lowered because the SRG provides a higher extinction ratio between transmission and reflection fundamental orders. In this way, the SRG behaves similarly to a volume Bragg grating.

Figure 14:
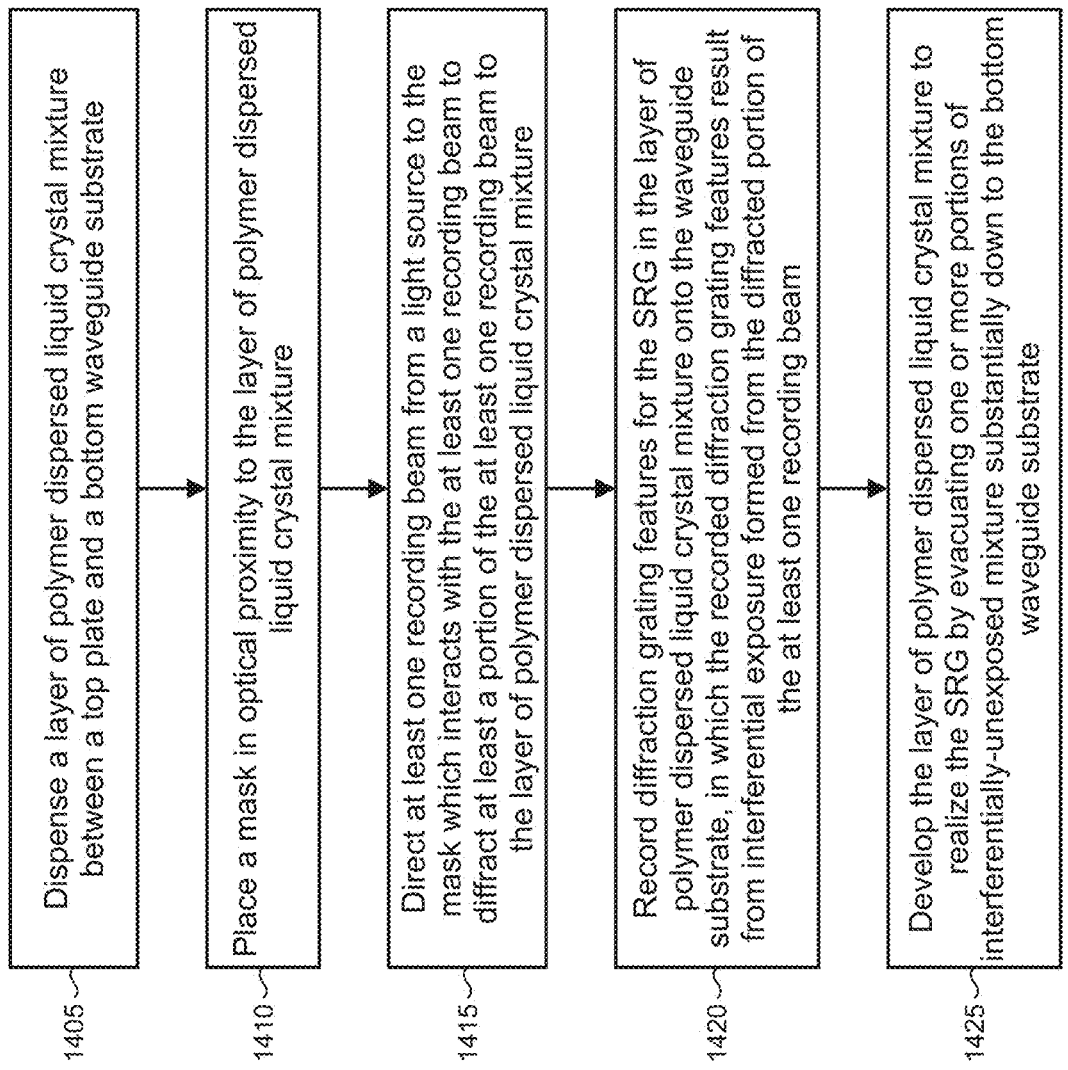
FIG. 14 is a flowchart of an illustrative method for slanted surface relief grating replication by optical proximity recording.

FIG. 14 is a flowchart 1400 of an illustrative method for replicating a surface relief grating (SRG) using optical proximity recording. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Block 1405 includes a step of dispensing a layer of polymer dispersed liquid crystal mixture between a top plate and a bottom waveguide substrate. Block 1410 includes a step of placing a mask in optical proximity to the layer of polymer dispersed liquid crystal mixture. Block 1415 includes a step of directing at least one recording beam from a light source to the mask which interacts with the at least one recording beam to diffract at least a portion of the at least one recording beam to the layer of polymer dispersed liquid crystal mixture.

Block 1420 includes a step of recording diffraction grating features for the SRG in the layer of polymer dispersed liquid crystal mixture onto the waveguide substrate, in which the recorded diffraction grating features result from interferential exposure formed from the diffracted portion of the at least one recording beam. Block 1425 includes a step of developing the layer of polymer dispersed liquid crystal mixture to realize the SRG by evacuating one or more portions of interferentially-unexposed mixture substantially down to the bottom waveguide substrate.

Figure 16:
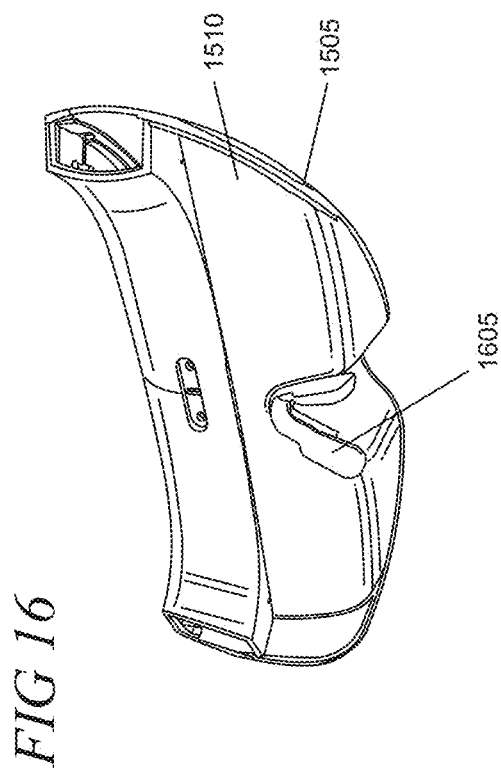
FIG. 16 shows a pictorial rear view of an illustrative sealed visor.
Figure 15:
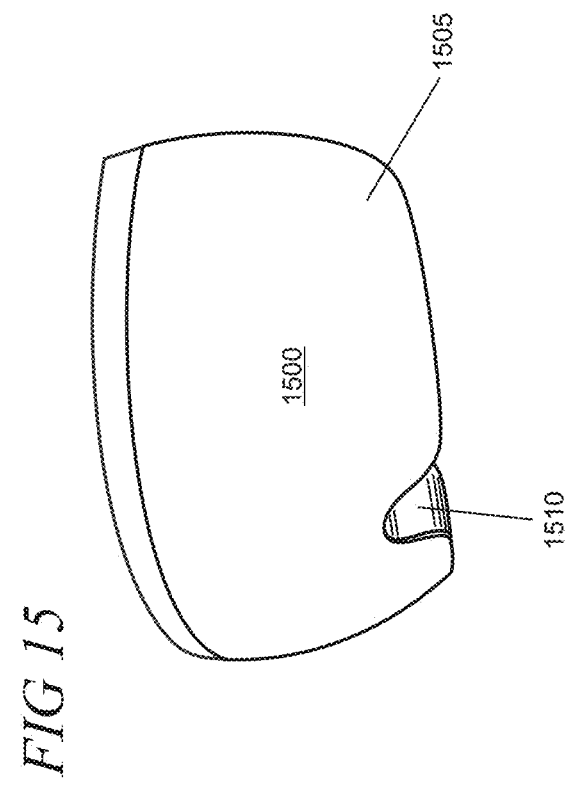
FIG. 15 shows a pictorial front view of an illustrative sealed visor that may be used as a component of an HMD device.

FIGS. 15 and 16 show respective front and rear views of an illustrative example of a visor 1500 that incorporates an internal near-eye display system 105 (FIGS. 1 and 2) that is used in the HMD device 100 as worn by a user 115. The visor, in some implementations, may be sealed to protect the internal display system. The visor typically interfaces with other components of the HMD device such as head-mounting/retention systems and other subsystems including sensors, power management, controllers, etc., as illustratively described in conjunction with FIGS. 15 and 16. Suitable interface elements (not shown) including snaps, bosses, screws, and other fasteners, etc. may also be incorporated into the visor.

Figure 17:
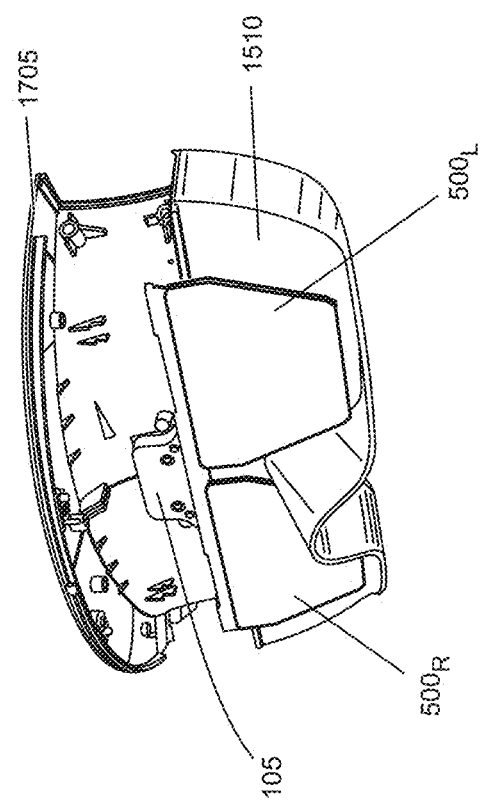
FIG. 17 shows a partially disassembled view of an illustrative sealed visor.

The visor 1500 may include see-through front and rear shields, 1505 and 1510 respectively, that can be molded using transparent or partially transparent materials to facilitate unobstructed vision to the display system and the surrounding real-world environment. Treatments may be applied to the front and rear shields such as tinting, mirroring, anti-reflective, anti-fog, and other coatings, and various colors and finishes may also be utilized. The front and rear shields are affixed to a chassis 1705 shown in the disassembled view in FIG. 17.

The sealed visor 1500 can physically protect sensitive internal components, including the display system 105, when the HMD device is operated and during normal handling for cleaning and the like. The display system in this illustrative example includes left and right waveguide combiners $500_L$ and $500_R$ that respectively provide virtual images to the user's left and right eyes for mixed- and/or virtual-reality applications. The visor can also protect the display system from environmental elements and damage should the HMD device be dropped or bumped, impacted, etc.

Figure 19:
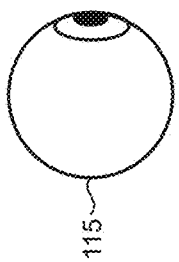
FIG. 19 shows a simplified side view of an illustrative virtual display system that includes a waveguide-based optical combiner that may be used in an HMD device.
Figure 19:
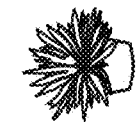

As shown in FIG. 16, the rear shield 1510 is configured in an ergonomically suitable form 1605 to interface with the user's nose, and nose pads and/or other comfort features can be included (e.g., molded-in and/or added-on as discrete components). In some applications, the sealed visor 1510 can also incorporate some level of optical diopter curvature (i.e., eye prescription) within the molded shields in some cases. The sealed visor 1500 can also be configured to incorporate a conjugate lens pair as shown in FIG. 19 and described in the accompanying text.

Figure 18:
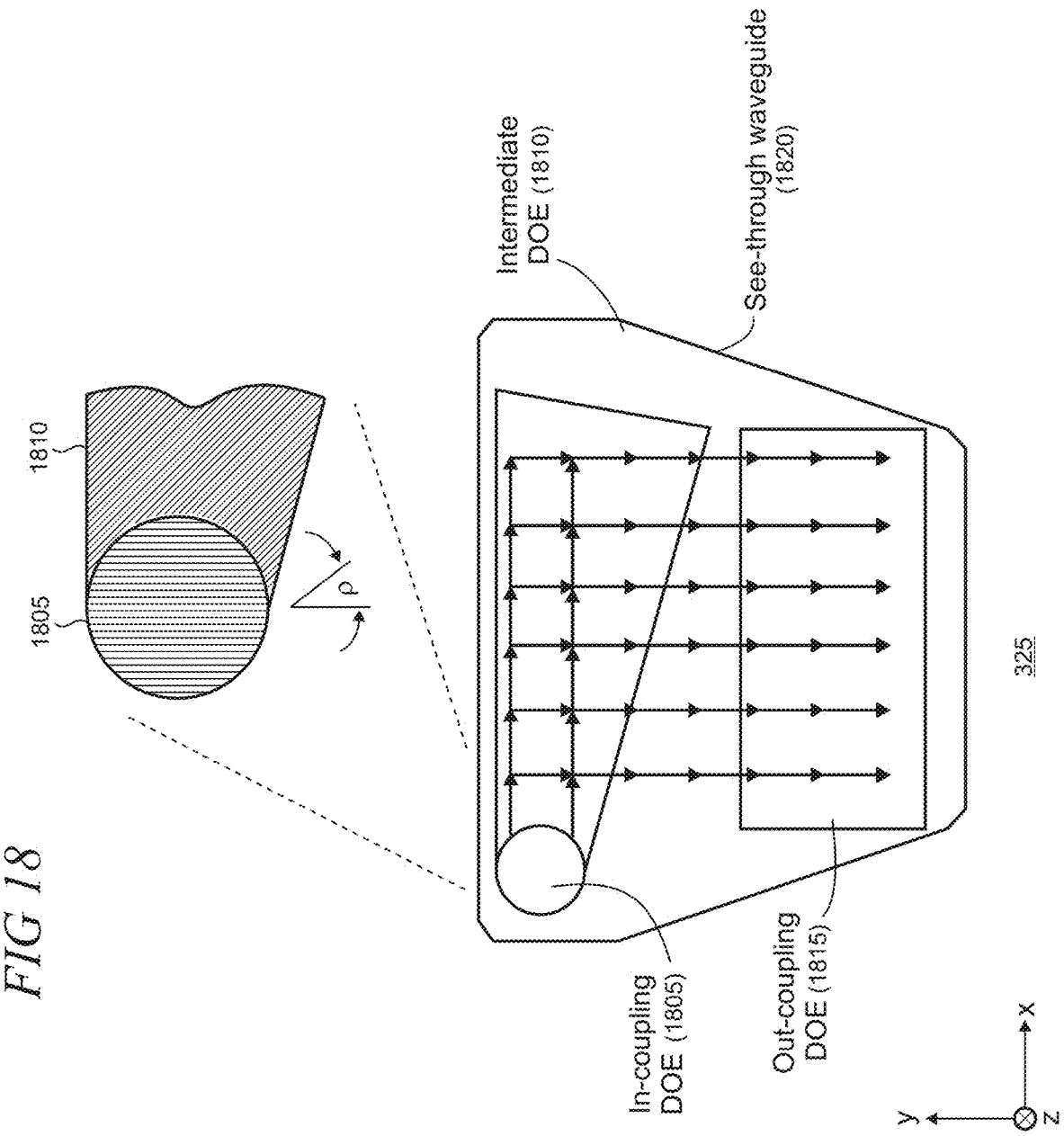
FIG. 18 shows an illustrative arrangement of diffractive optical elements (DOEs) configured for in-coupling, exit pupil expansion in two directions, and out-coupling.

FIG. 18 shows an illustrative waveguide combiner 325 having multiple diffractive optical elements (DOEs) that may be used in an embodiment of the display system 105 (FIG. 1) to provide input coupling, expansion of the exit pupil in two directions, and output coupling of virtual images from the display engine 305 (FIG. 3) to the user's eye. Each DOE is an optical element comprising a periodic structure that can modulate various properties of light in a periodic pattern such as the direction of optical axis, optical path length, and the like. The structure can be periodic in one dimension such as one-dimensional (1D) grating and/or be periodic in two dimensions such as two-dimensional (2D) grating.

The waveguide combiner 325 includes an in-coupling DOE 1805, an out-coupling DOE 1815, and an intermediate DOE 1810 that couples light between the in-coupling and out-coupling DOEs. The in-coupling DOE is configured to couple image light comprising one or more imaging beams from the display engine into the waveguide 1820. The intermediate DOE expands the exit pupil in a first direction along a first coordinate axis (e.g., horizontal), and the out-coupling DOE expands the exit pupil in a second direction along a second coordinate axis (e.g., vertical) and couples light out of the waveguide to the user's eye (i.e., outwards from the plane of the drawing page). The angle ρ is a rotation angle between the periodic lines of the in-coupling DOE and the intermediate DOE as shown. As the light propagates in the intermediate DOE (horizontally from left to right in the drawing), it is also diffracted (in the downward direction) to the out-coupling DOE.

While DOEs are shown in this illustrative example using a single in-coupling DOE disposed to the left of the intermediate DOE 1810, which is located above the out-coupling DOE, in some implementations, the in-coupling DOE may be centrally positioned within the waveguide and one or more intermediate DOEs can be disposed laterally from the in-coupling DOE to enable light to propagate to the left and right while providing for exit pupil expansion along the first direction. It may be appreciated that other numbers and arrangements of DOEs may be utilized to meet the needs of a particular implementation. In other implementations of devices using the present slanted surface relief grating replication by optical proximity recording, optical components operating in reflection may be utilized for one or more of an input coupler, intermediate coupler, or output coupler.

FIG. 19 shows a simplified side view of an illustrative virtual display system 1900 that is incorporated into the display system 105 (FIG. 1) and which may be used in the HMD device 100 to render virtual images. The virtual display system may function as an optical combiner by superimposing the rendered virtual images over the user's view of light from real-world objects 1905 to thus form the mixed-reality display.

The display system includes at least one partially transparent (i.e., see-through) waveguide 1820 that is configured to propagate visible light. While a single waveguide is shown in FIG. 19 for sake of clarity in exposition of the present principles, it will be appreciated that a plurality of waveguides may be utilized in some applications. For example, three waveguides may be utilized in which a single waveguide supports each color component in an RGB (red, green, blue) color space.

The waveguide 1820 facilitates light transmission between the virtual image source and the eye. One or more waveguides can be utilized in the near-eye display system because they are transparent and because they are generally small and lightweight. This is desirable in applications such as HMD devices where size and weight are generally sought to be minimized for reasons of performance and user comfort. Use of the waveguide 1820 can enable the virtual image source to be located out of the way, for example, on the side of the user's head or near the forehead, leaving only a relatively small, light, and transparent waveguide optical element in front of the eyes.

The user 115 can look through the waveguide 1820 to see real-world objects on the real-world side of the display system 105 (the real-world side is indicated by reference numeral 1912 in FIG. 19). For the virtual part of the FOV of the display system, virtual image light 1915 is provided by the display engine 305. The virtual image light is in-coupled to the waveguide by an input coupler 1925 and propagated through the waveguide in total internal reflection. The image light is out-coupled from the waveguide by an output coupler 1930. The combination of see-through waveguide and coupling elements may be referred to as a mixed-reality optical combiner because it functions to combine real-world and virtual-world images into a single display.

Typically, in such waveguide-based optical combiners, the input pupil needs to be formed over a collimated field, otherwise each waveguide exit pupil will produce an image at a slightly different distance. This results in a mixed visual experience in which images are overlapping with different focal depths in an optical phenomenon known as focus spread. The collimated inputs and outputs in conventional waveguide-based display systems provide virtual images displayed by the display system that are focused at infinity.

In some embodiments, the input coupler 1925 and output coupler 1930 may be configured as diffractive optical elements (DOEs). DOEs may comprise, for example, surface relief grating (SRG) structures and volumetric holographic grating (VHG) structures. An intermediate DOE (not shown) may also be disposed in the light path between the input coupler and output coupler in some cases. The intermediate DOE may be configured to provide exit pupil expansion in one direction (e.g., horizontal) while the output coupler may be configured to provide exit pupil expansion in a second direction (e.g., vertical).

In alternative embodiments, the optical combiner functionality provided by the waveguide and DOEs may be implemented using a reflective waveguide combiner. For example, partially reflective surfaces may be embedded in a waveguide and/or stacked in a geometric array to implement an optical combiner that uses partial field propagation. The reflectors can be half-tone, dielectric, holographic, polarized thin layer, or be fractured into a Fresnel element.

In other embodiments, a reflective waveguide combiner having wavelength-sensitive reflective coatings with any suitable in-coupling and/or out-coupling methods may be utilized. A reflective waveguide combiner may utilize a single waveguide in some implementations for all colors in the virtual images, which may be desirable in some applications. By comparison, diffractive combiners typically require multiple waveguides to meet a target FOV in polychromatic applications due to limitations on angular range that are dictated by the waveguide TIR condition. Other waveguide/coupling configurations beyond reflective and diffractive may also be utilized in combination with SRGs produced using the present principles. For example, waveguides that are refractive, polarized, hybrid diffractive/refractive, phase multiplexed holographic, and/or achromatic metasurfaces may be utilized in some cases.

A negative lens 1935 is located on the eye side of the waveguide 1820 (the eye side is indicated by reference numeral 1914 in FIG. 19). The negative lens acts over the entire extent of the eyebox associated with the user's eye to thereby create the diverging rays 1940 from the collimated rays 1945 that exit the output coupler 1930. When the display engine 305 is operated to project virtual images that are in-coupled into the waveguide 1820, the output diverging rays present the virtual images at a predetermined focal depth, d, from the display system at an apparent or virtual point of focus, F. For example, if the negative lens is configured with −0.5 diopters of optical power, then d is equal to 2 m.

To ensure that the user's view of the real world remains unperturbed by the negative lens, a conjugate positive (i.e., convex) lens 1950 is located on the real-world side of the waveguide 1820 to compensate for the impact of the negative lens on the eye side. The conjugate pair of positive and negative lenses may be referred to as a push-pull lens pair in some contexts. In some applications, the functionality of the negative lens may be provided by a discrete standalone optical element. In other applications, one or more of the elements in the display system may be configured to incorporate the negative lens as an additional functionality. For example, the negative lens functionality can be integrated into the output coupler and/or waveguide in the display system using any suitable technique.

Different amounts of optical power may be utilized to provide for focal planes that are located at other distances to suit requirements of a particular application. The power of the negative lens 1935 does not affect the zeroth diffraction order that travels in TIR down the waveguide 1820 (i.e., from top to bottom in the drawings), but instead only the diffracted out-coupled field. In addition, the see-through field is not affected by the negative lens because whatever portion of the see-through field that is diffracted by the output coupler 1930 is trapped by TIR in the waveguide and is therefore not transmitted to the user's eye.

Figure 20:
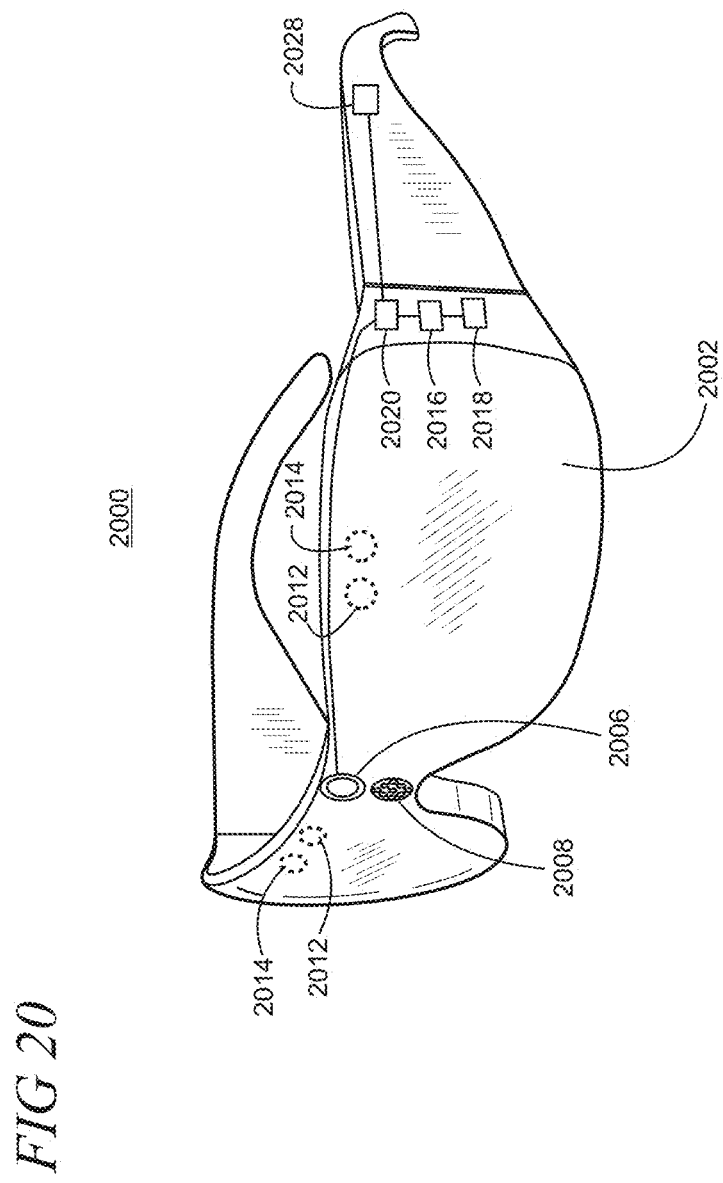
FIG. 20 is a pictorial view of an illustrative example of a virtual-reality or mixed-reality HMD device that may use articles of manufacture produced using the present slanted surface relief grating replication by optical proximity recording.
Figure 21:
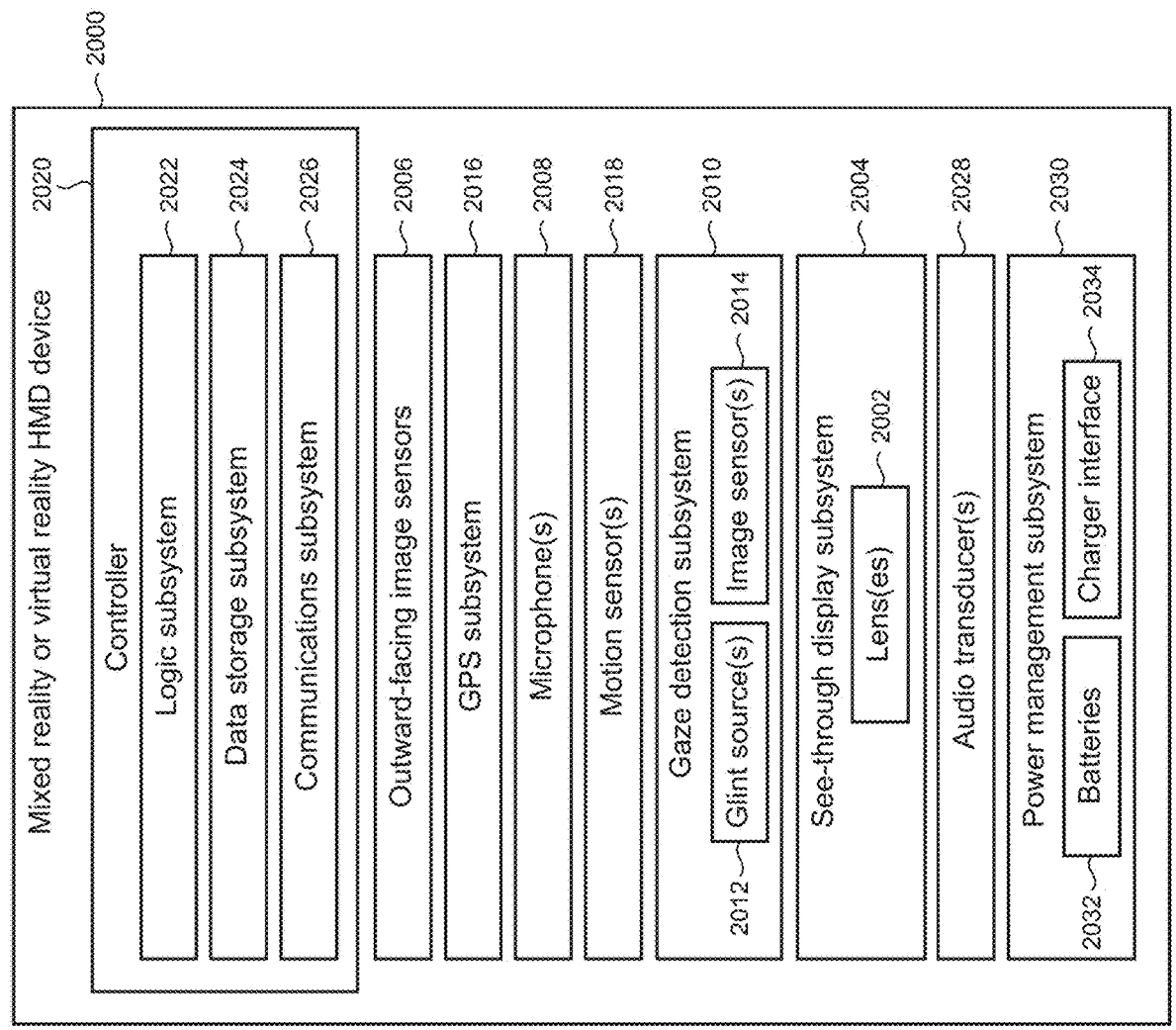
FIG. 21 shows a block diagram of an illustrative example of a virtual-reality or mixed-reality HMD device that may use articles of manufacture produced using the present slanted surface relief grating replication by optical proximity recording.

FIG. 20 shows one particular illustrative example of a mixed-reality HMD device 2000, and FIG. 21 shows a functional block diagram of the device 2000. The HMD device 2000 provides an alternative form factor to the HMD device 100 shown in FIGS. 1, 2, and 15-17. HMD device 2000 comprises one or more lenses 2002 that form a part of a see-through display subsystem 2004, so that images may be displayed using lenses 2002 (e.g., using projection onto lenses 2002, one or more waveguide systems, such as a near-eye display system, incorporated into the lenses 2002, and/or in any other suitable manner).

HMD device 2000 further comprises one or more outward-facing image sensors 2006 configured to acquire images of a background scene and/or physical environment being viewed by a user and may include one or more microphones 2008 configured to detect sounds, such as voice commands from a user. Outward-facing image sensors 2006 may include one or more depth sensors and/or one or more two-dimensional image sensors. In alternative arrangements, as noted above, a mixed-reality or virtual-reality display system, instead of incorporating a see-through display subsystem, may display mixed-reality or virtual-reality images through a viewfinder mode for an outward-facing image sensor.

The HMD device 2000 may further include a gaze detection subsystem 2010 configured for detecting a direction of gaze of each eye of a user or a direction or location of focus, as described above. Gaze detection subsystem 2010 may be configured to determine gaze directions of each of a user's eyes in any suitable manner. For example, in the illustrative example shown, a gaze detection subsystem 2010 includes one or more glint sources 2012, such as IR (Infrared) light or visible sources as described above, that are configured to cause a glint of light to reflect from each eyeball of a user, and one or more image sensors 2014, such as inward-facing sensors, that are configured to capture an image of each eyeball of the user. Changes in the glints from the user's eyeballs and/or a location of a user's pupil, as determined from image data gathered using the image sensor(s) 2014, may be used to determine a direction of gaze.

In addition, a location at which gaze lines projected from the user's eyes intersect the external display may be used to determine an object at which the user is gazing (e.g., a displayed virtual object and/or real background object). Gaze detection subsystem 2010 may have any suitable number and arrangement of light sources and image sensors. In some implementations, the gaze detection subsystem 2010 may be omitted.

The HMD device 2000 may also include additional sensors. For example, HMD device 2000 may comprise a global positioning system (GPS) subsystem 2016 to allow a location of the HMD device 2000 to be determined. This may help to identify real-world objects, such as buildings, etc., that may be located in the user's adjoining physical environment.

The HMD device 2000 may further include one or more motion sensors 2018 (e.g., inertial, multi-axis gyroscopic, or acceleration sensors) to detect movement and position/orientation/pose of a user's head when the user is wearing the system as part of a mixed-reality or virtual-reality HMD device. Motion data may be used, potentially along with eye-tracking glint data and outward-facing image data, for gaze detection, as well as for image stabilization to help correct for blur in images from the outward-facing image sensor(s) 2006. The use of motion data may allow changes in gaze direction to be tracked even if image data from outward-facing image sensor(s) 2006 cannot be resolved.

In addition, motion sensors 2018, as well as microphone(s) 2008 and gaze detection subsystem 2010, also may be employed as user input devices, such that a user may interact with the HMD device 2000 via gestures of the eye, neck and/or head, as well as via verbal commands in some cases. It may be understood that sensors illustrated in FIGS. 20 and 21 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 2000 can further include a controller 2020 such as one or more processors having a logic subsystem 2022 and a data storage subsystem 2024 in communication with the sensors, gaze detection subsystem 2010, display subsystem 2004, and/or other components through a communications subsystem 2026. The communications subsystem 2026 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2024 may include instructions stored thereon that are executable by logic subsystem 2022, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 2000 is configured with one or more audio transducers 2028 (e.g., speakers, earphones, etc.) so that audio can be utilized as part of a mixed-reality or virtual-reality experience. A power management subsystem 2030 may include one or more batteries 2032 and/or protection circuit modules (PCMs) and an associated charger interface 2034 and/or remote power interface for supplying power to components in the HMD device 2000.

It may be appreciated that the HMD device 2000 is described for the purpose of example, and thus is not meant to be limiting. It may be further understood that the display system may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Figure 22:
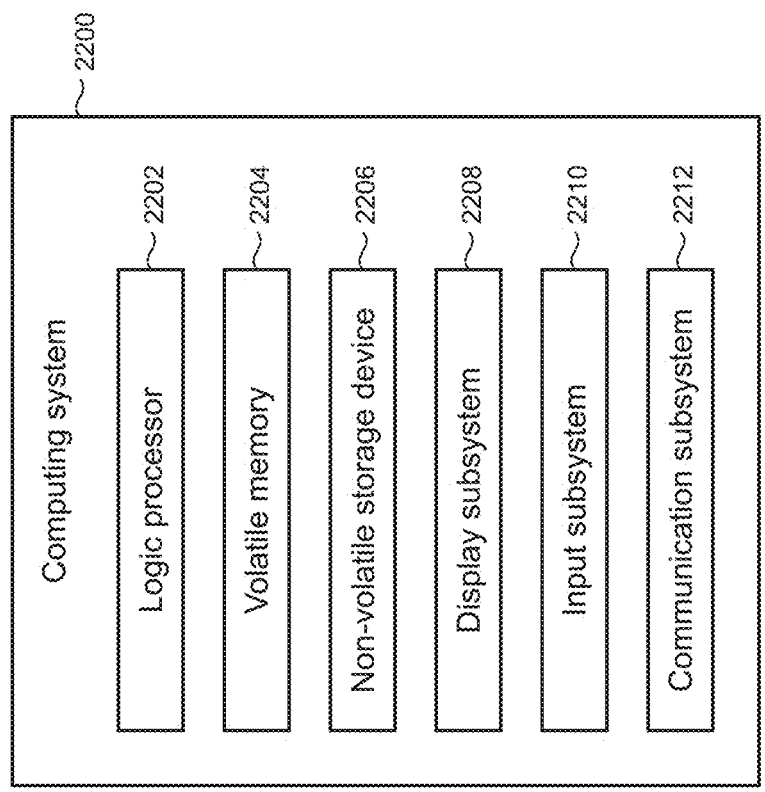
FIG. 22 schematically shows an illustrative example of a computing system that may use articles of manufacture produced using the present slanted surface relief grating replication by optical proximity recording.

FIG. 22 schematically shows an illustrative example of a computing system that can utilize SRGs that are replicate using the present principles. Computing system 2200 is shown in simplified form. Computing system 2200 may take the form of one or more personal computers, server computers, tablet computers, home-entertainment computers, network computing devices, gaming devices, mobile computing devices, mobile communication devices (e.g., smartphone), wearable computers, and/or other computing devices.

Computing system 2200 includes a logic processor 2202, volatile memory 2204, and a non-volatile storage device 2206. Computing system 2200 may optionally include a display subsystem 2208, input subsystem 2210, communication subsystem 2212, and/or other components not shown in FIG. 22.

Logic processor 2202 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more processors configured to execute software instructions. In addition, or alternatively, the logic processor may include one or more hardware or firmware logic processors configured to execute hardware or firmware instructions. Processors of the logic processor may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Non-volatile storage device 2206 includes one or more physical devices configured to hold instructions executable by the logic processors to implement the methods and processes described herein. When such methods and processes are implemented, the state of non-volatile storage device 2206 may be transformed (e.g., to hold different data).

Non-volatile storage device 2206 may include physical devices that are removable and/or built-in. Non-volatile storage device 2206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 2206 may include nonvolatile, dynamic, static, read/write, read-only, sequential-access, location-addressable, file-addressable, and/or content-addressable devices. It will be appreciated that non-volatile storage device 2206 is configured to hold instructions even when power is cut to the non-volatile storage device 2206.

Volatile memory 2204 may include physical devices that include random access memory. Volatile memory 2204 is typically utilized by logic processor 2202 to temporarily store information during processing of software instructions. It will be appreciated that volatile memory 2204 typically does not continue to store instructions when power is cut to the volatile memory 2204.

Aspects of logic processor 2202, volatile memory 2204, and non-volatile storage device 2206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 2200 typically implemented in software by a processor to perform a particular function using portions of volatile memory, which function involves transformative processing that specially configures the processor to perform the function. Thus, a program may be instantiated via logic processor 2202 executing instructions held by non-volatile storage device 2206, using portions of volatile memory 2204. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 2208 may be used to present a visual representation of data held by non-volatile storage device 2206. This visual representation may take the form of a graphical user interface (GUI). As the herein described methods and processes change the data held by the non-volatile storage device, and thus transform the state of the non-volatile storage device, the state of display subsystem 2208 may likewise be transformed to visually represent changes in the underlying data. Display subsystem 2208 may include one or more display devices utilizing virtually any type of technology; however, one utilizing a MEMS projector to direct laser light may be compatible with the eye-tracking system in a compact manner. Such display devices may be combined with logic processor 2202, volatile memory 2204, and/or non-volatile storage device 2206 in a shared enclosure, or such display devices may be peripheral display devices.

When included, input subsystem 2210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 2212 may be configured to communicatively couple various computing devices described herein with each other, and with other devices. Communication subsystem 2212 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 2200 to send and/or receive messages to and/or from other devices via a network such as the Internet.

Various exemplary embodiments of the present slanted surface relief grating replication by optical proximity recording are now presented by way of illustration and not as an exhaustive list of all embodiments. An example includes a method for replicating a surface relief grating (SRG) using optical proximity recording, comprising: dispensing a layer of polymer dispersed liquid crystal mixture between a top plate and a bottom waveguide substrate; placing a mask in optical proximity to the layer of polymer dispersed liquid crystal mixture; directing at least one recording beam from a light source to the mask which interacts with the at least one recording beam to diffract at least a portion of the at least one recording beam to the layer of polymer dispersed liquid crystal mixture; recording diffraction grating features for the SRG in the layer of polymer dispersed liquid crystal mixture onto the waveguide substrate, in which the recorded diffraction grating features result from interferential exposure formed from the diffracted portion of the at least one recording beam; and developing the layer of polymer dispersed liquid crystal mixture to realize the SRG by evacuating one or more portions of interferentially-unexposed mixture substantially down to the bottom waveguide substrate.

In another example, the method further includes removing the top plate prior to developing the layer of polymer dispersed liquid crystal mixture. In another example, the developing comprises ashing the SRG using an oxygen plasma. In another example, the light source comprises a laser emitting light in the ultraviolet range of wavelengths. In another example, the layer of polymer dispersed liquid crystal mixture comprises a reactive monomer liquid crystal mixture. In another example, the method further comprises utilizing atomic layer deposition processing on the realized SRG. In another example, the mask is a binary mask comprising a chromium layer deposed on a glass substrate. In another example, the diffraction grating features in the SRG are slanted. In another example, a refractive index of the SRG is lower than a refractive index of the waveguide substrate. In another example, the method further comprises controlling the interferential exposure by adjusting the optical proximity spacing between the mask and the layer of polymer dispersed liquid crystal mixture. In another example, the method further comprises controlling the interferential exposure by adjusting optical characteristics of the at least one recording beam. In another example, the method further comprises controlling the interferential exposure by adjusting characteristics of the mask including one or more of aperture size, shape, spacing, or pattern. In another example, the evacuation provides the SRG with minimal residual mixture in trenches between grating features to reduce Fresnel reflections. In another example, the method further comprises configuring the SRG grating features with an aspect ratio and refractive index for one of maximizing Bragg selectivity at an interface between the SRG and waveguide substrate or tuning the Bragg selectivity.

A further example includes a system for replicating a surface relief grating (SRG) on an optical waveguide using optical proximity recording, comprising: a top plate configured to contain a layer of polymer dispersed liquid crystal mixture in an enclosed volume between the top plate and the waveguide substrate; a binary mask configured for adjustable optical proximity to the top plate; and a controllable laser source for directing at least one recording beam from the binary mask which interacts with the at least one recording light beam to diffract at least a portion of the at least one recording beam to the layer of polymer dispersed liquid crystal mixture to record diffraction grating features for the SRG in the layer of polymer dispersed liquid crystal mixture on the waveguide substrate.

In another example, the top plate is removable from the enclosed volume as is optically transparent to a range of wavelengths produced by the controllable laser source. In another example, the controllable source is configured for directing a plurality of recording beams of the same frequency that interfere with each other to produce an interference pattern in the layer of polymer dispersed liquid crystal mixture.

A further example includes a head-mounted display (HMD) device wearable by a user and supporting a mixed-reality experience including viewing virtual images from a virtual world that are combined with real-world images of objects in a physical world, comprising: a display engine configured for producing virtual images; a see-through waveguide combiner through which the user can view the physical world and on which the virtual images are rendered within a field of view (FOV) of the HMD device; and an out-coupling diffractive optical element (DOE) disposed on a waveguide portion of the see-through waveguide combiner, the DOE comprising a surface relief grating (SRG) configured with surfaces between grating feature trenches that are arranged to maximize Bragg selectivity at an interface between the SRG and the waveguide portion.

In another example, the SRG includes slanted grating features. In another example, the SRG is produced using a method for optical proximity recording comprising: dispensing a layer of polymer dispersed liquid crystal mixture between a top plate and a bottom waveguide substrate; placing a mask in optical proximity to the layer of polymer dispersed liquid crystal mixture; directing at least one recording beam from a light source to the mask which interacts with the at least one light beam to diffract at least a portion of the at least one recording beam to the layer of polymer dispersed liquid crystal mixture; recording diffraction grating features for the SRG in the layer of polymer dispersed liquid crystal mixture onto the waveguide substrate, in which the recorded diffraction grating features result from interferential exposure formed from the diffracted portion of the at least one recording beam; and developing the layer of polymer dispersed liquid crystal mixture to realize the SRG by evacuating one or more portions of interferentially-unexposed mixture substantially down to the bottom waveguide substrate.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for replicating a surface relief grating (SRG) using optical proximity recording, wherein the SRG is usable in a mixed-reality display system, having a real-world side and an eye side, that combines light for virtual images and real-world images for display to a user, the method comprising:
   dispensing a layer of polymer dispersed liquid crystal mixture between a top plate and a bottom waveguide substrate; placing a mask in optical proximity to the layer of polymer dispersed liquid crystal mixture;
   directing at least one recording beam from a light source to the mask which interacts with the at least one recording beam to diffract at least a portion of the at least one recording beam to the layer of polymer dispersed liquid crystal mixture;
   recording diffraction grating features for the SRG in the layer of polymer dispersed liquid crystal mixture onto the bottom waveguide substrate, in which the recorded diffraction grating features result from interferential exposure formed from the diffracted portion of the at least one recording beam; and
   and developing the layer of polymer dispersed liquid crystal mixture to realize the SRG with a minimal bias layer by evacuating one or more portions of interferentially-unexposed mixture substantially down to the bottom waveguide substrate using plasma ashing, wherein the evacuation of the interferentially-unexposed mixture reduces virtual image light being diffracted by the SRG towards the real-world side of the display system.

2. The method of claim 1 further including removing the top plate prior to developing the layer of polymer dispersed liquid crystal mixture.

3. The method of claim 1 in which the developing comprises ashing the SRG using an oxygen plasma.

4. The method of claim 1 in which the light source comprises a laser emitting light in the ultraviolet range of wavelengths.

5. The method of claim 1 in which the layer of polymer dispersed liquid crystal mixture comprises a reactive monomer liquid crystal mixture.

6. The method of claim 1 further comprising utilizing atomic layer deposition processing on the realized SRG.

7. The method of claim 1 in which the mask is a binary mask comprising a chromium layer deposed on a glass substrate.

8. The method of claim 1 in which the diffraction grating features in the SRG are slanted.

9. The method of claim 1 in which a refractive index of the SRG is lower than a refractive index of the waveguide substrate.

10. The method of claim 1 further comprising controlling the interferential exposure by adjusting the optical proximity spacing between the mask and the layer of polymer dispersed liquid crystal mixture.

11. The method of claim 1 further comprising controlling the interferential exposure by adjusting optical characteristics of the at least one recording beam.

12. The method of claim 1 further comprising controlling the interferential exposure by adjusting characteristics of the mask including one or more of aperture size, shape, spacing, or pattern.

13. The method of claim 1 in which the evacuation provides the SRG with minimal residual mixture in trenches between grating features to reduce Fresnel reflections.

14. The method of claim 1 further comprising configuring the SRG grating features with an aspect ratio and refractive index for one of maximizing Bragg selectivity at an interface between the SRG and waveguide substrate or tuning the Bragg selectivity.

15. A system for replicating a surface relief grating (SRG) on an optical waveguide using optical proximity recording, wherein the SRG is usable in a mixed-reality display system, having a real-world side and an eye side, that combines light for virtual images and real-world images for display to a user, comprising:
   a top plate configured to contain a layer of polymer dispersed liquid crystal mixture in an enclosed volume between the top plate and a waveguide substrate;
   a binary mask configured for adjustable optical proximity to the top plate;
   a controllable laser source for directing at least one recording beam to the binary mask which interacts with the at least one recording light beam to diffract at least a portion of the at least one recording beam to the layer of polymer dispersed liquid crystal mixture to record diffraction grating features for the SRG in the layer of polymer dispersed liquid crystal mixture on the waveguide substrate; and
   and a plasma source configured for subjecting the SRG to plasma ashing to evacuate residual polymer dispersed liquid crystal mixture forming a bias layer between the diffraction grating features, wherein the evacuation of the residual polymer dispersed liquid crystal mixture reduces virtual image light being ex-raced diffracted by the SRG towards the real-world side of the display system.

16. The system of claim 15 in which the top plate is removable from the enclosed volume and is optically transparent to a range of wavelengths produced by the controllable laser source.

17. The system of claim 15 in which the controllable source is configured for directing a plurality of recording beams of the same frequency that interfere with each other to produce an interference pattern in the layer of polymer dispersed liquid crystal mixture.

18. A head-mounted display (HMD) device wearable by a user and supporting a mixed-reality experience including viewing virtual images from a virtual world that are combined with real-world images of objects in a physical world, comprising:

a display engine configured for producing virtual images;
a see-through waveguide combiner through which the user can view the physical world and on which the virtual images are rendered within a field of view (FOV) of the HMD device; and
an out-coupling diffractive optical element (DOE) disposed on a waveguide portion of the see-through waveguide combiner, the DOE comprising a surface relief grating (SRG) configured with grating features directly disposed on the waveguide portion, and wherein a refractive index of the grating features is lower relative to a refractive index of the waveguide portion,
wherein SRG is produced using a method for optical proximity recording comprising:

dispensing a layer of polymer dispersed liquid crystal mixture between a top plate and a bottom waveguide substrate;
placing a mask in optical proximity to the layer of polymer dispersed liquid crystal mixture;
directing at least one recording beam from a light source to the mask which interacts with the at least one light beam to diffract at least a portion of the at least one recording beam to the layer of polymer dispersed liquid crystal mixture;
recording diffraction grating features for the SRG in the layer of polymer dispersed liquid crystal mixture onto the bottom waveguide substrate, in which the recorded diffraction grating features result from interferential exposure formed from the diffracted portion of the at least one recording beam; and
and developing the layer of polymer dispersed liquid crystal mixture to realize the SRG by evacuating one or more portions of interferentially-unexposed mixture substantially down to the bottom waveguide substrate using plasma ashing, wherein the evacuation of the interferentially-unexposed mixture reduces virtual image light being diffracted by the SRG towards the real-world side of the display system.

19. The HMD device of claim 18 in which the SRG includes slanted grating features.

* * * * *